United States Patent
Tang et al.

(10) Patent No.: US 8,520,322 B2
(45) Date of Patent: Aug. 27, 2013

(54) LENS SYSTEM

(75) Inventors: Hsiang-Chi Tang, Taichung (TW);
Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 162 days.

(21) Appl. No.: 13/171,480

(22) Filed: Jun. 29, 2011

(65) Prior Publication Data
US 2012/0194922 A1    Aug. 2, 2012

(30) Foreign Application Priority Data
Jan. 28, 2011    (TW) .............................. 100103352 A

(51) Int. Cl.
*G02B 13/18*    (2006.01)

(52) U.S. Cl.
USPC ........................................................ 359/716

(58) Field of Classification Search
USPC .......... 359/362, 366, 659, 716, 784, 749–753
See application file for complete search history.

(56) References Cited

U.S. PATENT DOCUMENTS

| | | | | |
|---|---|---|---|---|
| 4,412,726 | A * | 11/1983 | Horimoto | 359/752 |
| 4,806,001 | A * | 2/1989 | Okabe et al. | 359/708 |
| 5,218,478 | A * | 6/1993 | Itoh | 359/692 |
| 5,808,808 | A * | 9/1998 | Yamanashi | 359/682 |
| 6,476,851 | B1 * | 11/2002 | Nakamura | 348/65 |
| 2009/0135290 | A1 * | 5/2009 | Kobayashi | 348/345 |

\* cited by examiner

*Primary Examiner* — Alessandro Amari
*Assistant Examiner* — Jie Lei
(74) *Attorney, Agent, or Firm* — CKC & Partners Co., Ltd.

(57) ABSTRACT

A lens system includes, in order from an object side to an image side: the first lens element with negative refractive power having a convex object-side surface and concave image-side surface, the second lens element with refractive power, the third lens element with positive refractive power having a convex image-side surface, the fourth lens element with negative refractive power having a concave object-side surface, the fourth lens element connected to the third lens element, and the fifth lens element with negative refractive power. By such arrangement, the aberration of the lens system can be corrected. The photosensitivity of the lens system can be effectively reduced while retaining high image quality.

20 Claims, 16 Drawing Sheets

LENS SYSTEM

RELATED APPLICATIONS

The application claims priority to Taiwan Application Serial Number 100103352, filed Jan. 28, 2011, which is herein incorporated by reference.

BACKGROUND

1. Technical Field

The present invention relates to a lens system. More particularly, the present invention relates to a compact lens system applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly on a portable electronic product mainly adopts a four-element lens structure. Due to the popularity of high specification mobile products, such as Smart Phones and PDAs (Personal Digital Assistants), the requirements of pixels and image quality of the compact photographing lens assembly increase rapidly. However, the conventional four-piece lens structure cannot satisfy the requirements of the compact photographing lens assembly. Furthermore, the trend of modern electronics gradually moves toward high performance and compact size. Therefore, a need exists in the art for providing a photographing lens assembly having excellent imaging quality without a long total track length for portable mobile electronics.

SUMMARY

A lens system includes, in order from an object side to an image side, a first lens element, a second lens element, a third lens element, a fourth lens element and a fifth lens element. The first lens element with negative refractive power has a convex object-side surface and a concave image-side surface. The second lens element is with refractive power. The third lens element with positive refractive power has a convex image-side surface. The fourth lens element with negative refractive power has a concave object-side surface, wherein the fourth lens element is connected to the third lens element. The fifth lens element is with negative refractive power. A focal length of the first lens element is f1, a focal length of the fifth lens element is f5, and they satisfy the following relationship:

$$0 < f5/f1 < 1.0.$$

A lens system includes, in order from an object side to an image side, a front group lens assembly, a stop and a rear group lens assembly. The front group lens assembly includes, in order from an object side to an image side, a first lens element and a second lens element. The first lens element with negative refractive power has a convex object-side surface and a concave image-side surface. The second lens element is with refractive power. The rear group lens assembly includes, in order from an object side to an image side, a third lens element, a fourth lens element and a fifth lens element. The third lens element with positive refractive power has a convex image-side surface. The fourth lens element with negative refractive power has a concave object-side surface, wherein the fourth lens element is connected to the third lens element. The fifth lens element is with negative refractive power. A focal length of the lens system is f, a focal length of the first lens element is f1, a focal length of the second lens element is f2, and they satisfy the following relationship:

$$|f/f1| + |f/f2| \leq 1.6.$$

DETAILED DESCRIPTION

Figure 1:
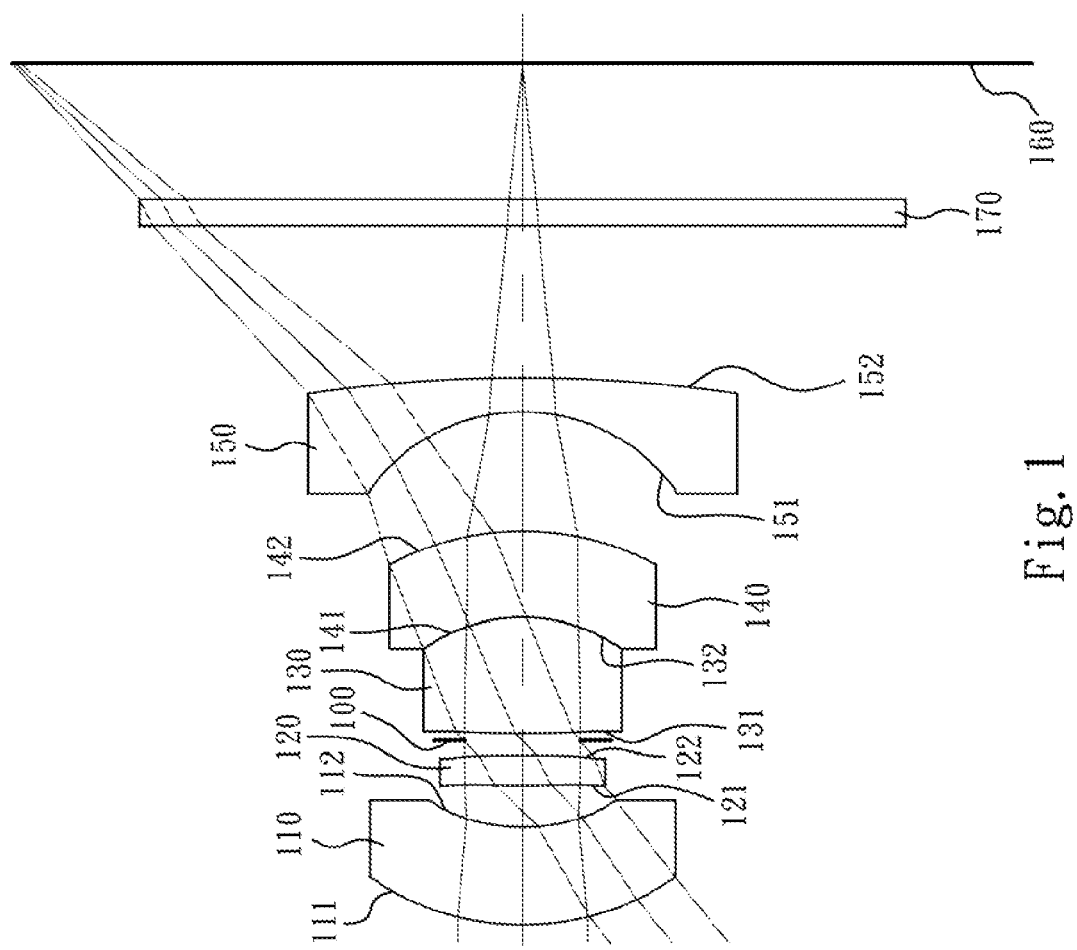
FIG. 1 is a schematic view of a lens system according to the first embodiment.

A lens system includes five lens elements with refractive power, in order from an object side to an image side, a first lens element, a second lens element, a third lens element, a fourth lens element and a fifth lens element. The lens system further includes an image sensor located on an image plane.

The first lens element is with negative refractive power for correcting the aberration of the lens system. The first lens element has a convex object-side surface and a concave image-side surface, so that the astigmatism of the lens system can be corrected.

The second lens element can be with positive refractive power or negative refractive power.

The third lens element is with positive refractive power main refractive power for reducing the total track length of the lens system. The third lens element has a convex image-side surface for correcting the high order aberration of the lens system.

The fourth lens element is with negative refractive power and is connected to the third lens element for correcting the aberration generated from the third lens element. The fourth lens element has a concave object-side surface for correcting the astigmatism of the lens system.

The fifth lens element is with negative refractive power, so that the principal point of the lens system can be positioned away from the image plane, and the total track length of the lens system can be reduced, so as to maintain the compact size of the lens system.

In other words, the lens system includes, in order from an object side to an image side, a front group lens assembly, a stop and a rear group lens assembly. The front group lens assembly includes, in order from an object side to an image side, the foregoing first lens element and second lens element. The rear group lens assembly includes, in order from an object side to an image side, the foregoing third lens element, fourth lens element and fifth lens element.

A focal length of the first lens element is f1, a focal length of the fifth lens element is f5, and they satisfy the following relationship:

$$0<f5/f1<1.0.$$

Therefore, the negative refractive power of the first lens element and the fifth lens element can correct the aberration of the lens system while providing high image quality.

A focal length of the lens system is f, a curvature radius of the object-side surface of the fourth lens element is R7, and they satisfy the following relationship:

$$-0.33<R7/f<-0.1.$$

Therefore, the object-side surface of the fourth lens element can correct the aberration generated from the aberration.

The focal length of the lens system is f, the focal length of the first lens element is f1, a focal length of the second lens element is f2, and they satisfy the following relationship:

$$|f/f1|+|f/f2|\leq 1.6.$$

Therefore, the refractive power of the first lens element and the second lens element can correct the aberration of the lens system.

f, f1 and f2 can further satisfy the following relationship:

$$|f/f1|+|f/f2|\leq 1.0.$$

A curvature radius of the object-side surface of the third lens element is R5, a curvature radius of the image-side surface of the third lens element is R6, and they satisfy the following relationship:

$$0\leq (R5+R6)/(R5-R6)<2.0.$$

Therefore, the curvature of the third lens element can enhance the refractive power thereof effectively or correct the aberration of the third lens element.

R5 and R6 can further satisfy the following relationship:

$$0\leq (R5+R6)/(R5-R6)\leq 1.0.$$

The focal length of the lens system is f, a focal length of the third lens element is f3, and they satisfy the following relationship:

$$2.4<f/f3<4.5.$$

Therefore, the refractive power of the third lens element can reduce the total track length of the lens system.

The curvature radius of the object-side surface of the fourth lens element is R7, a curvature radius of the image-side surface of the fourth lens element is R8, and they satisfy the following relationship:

$$-0.3<R7/R8<0.85.$$

Therefore, the curvature of the fourth lens element can correct the astigmatism of the lens system.

An axial distance between the second lens element and the third lens element is T23, a thickness of the third lens element near the optical axis is CT3, and they satisfy the following relationship:

$$0<T23/CT3<1.0.$$

Therefore, the location of the third lens element can reduce the total track length of the lens system.

The lens system further includes a stop, which can be an aperture stop. The aperture stop is located between the second lens element and the third lens element. By such arrangement, the wide-angle characteristic of the lens system can be enhanced while correcting the distortion and the chromatic aberration of magnification and reducing the photosensitivity of the lens system.

The focal length of the lens system is f, a composite focal length of the third lens element and the fourth lens element is f34, and they satisfy the following relationship:

$$1.3<f/f34<3.0.$$

Therefore, the composite refractive power of the third lens element and the fourth lens element can reduce the total track length of the lens system for avoiding the aberration would be too large.

f, f34 can further satisfy the following relationship:

$$1.5<f/f34<2.8.$$

The focal length of the lens system is f, the focal length of the second lens element is f2, and they satisfy the following relationship:

$$|f/f2|<0.6.$$

Therefore, the refractive power of the second lens element can reduce the photosensitivity of the lens system.

The third lens element can be made of glass material, and the refractive index of the third lens element is N3, and N3 satisfy the following relationship:

$$N3>1.75.$$

Therefore, the refractive power of the third lens element can be enhanced due to the glass material which provides larger refractive index.

A half of a diagonal length of an effective photosensitive area of the image sensor is ImgH, an axial distance between the object-side surface of the first lens element and the image-side surface of the fifth lens element is Td, and they satisfy the following relationship:

$$Td/ImgH<1.2.$$

Therefore, the total track length of the lens system can be reduced, so as to maintain the compact size of the lens system for applications on lightweight its and portable electronic products.

According to the lens system of the present invention, a lens element can be made of glass material or plastic material. When the lens element is made of glass material, the refractive index is larger, so that the distribution of degree of freedom of the refractive power of the lens system can be increased. When the lens element is made of plastic material, the cost of manufacturing can be effectively reduced. Additionally, the surfaces of the lens element can be aspheric, so as to easily form the surfaces into non-spherical profiles, thereby obtaining more controllable variables for reducing aberration and amount of the required lens elements. Therefore, the total track length of the lens system can be reduced.

According to the lens system of the present invention, if a lens element has a convex surface, it means that the paraxial region of the surface is convex, and if a lens element has a concave surface, it means that the paraxial region of the surface is concave.

According to the lens system of the present invention, the lens system can include at least one stop for reducing stray light while retaining high image quality. The stop can be a glare stop or a field stop.

According to the above description of the present invention, the following 1st-8th specific embodiments are provided for further explanation.

Figure 2:
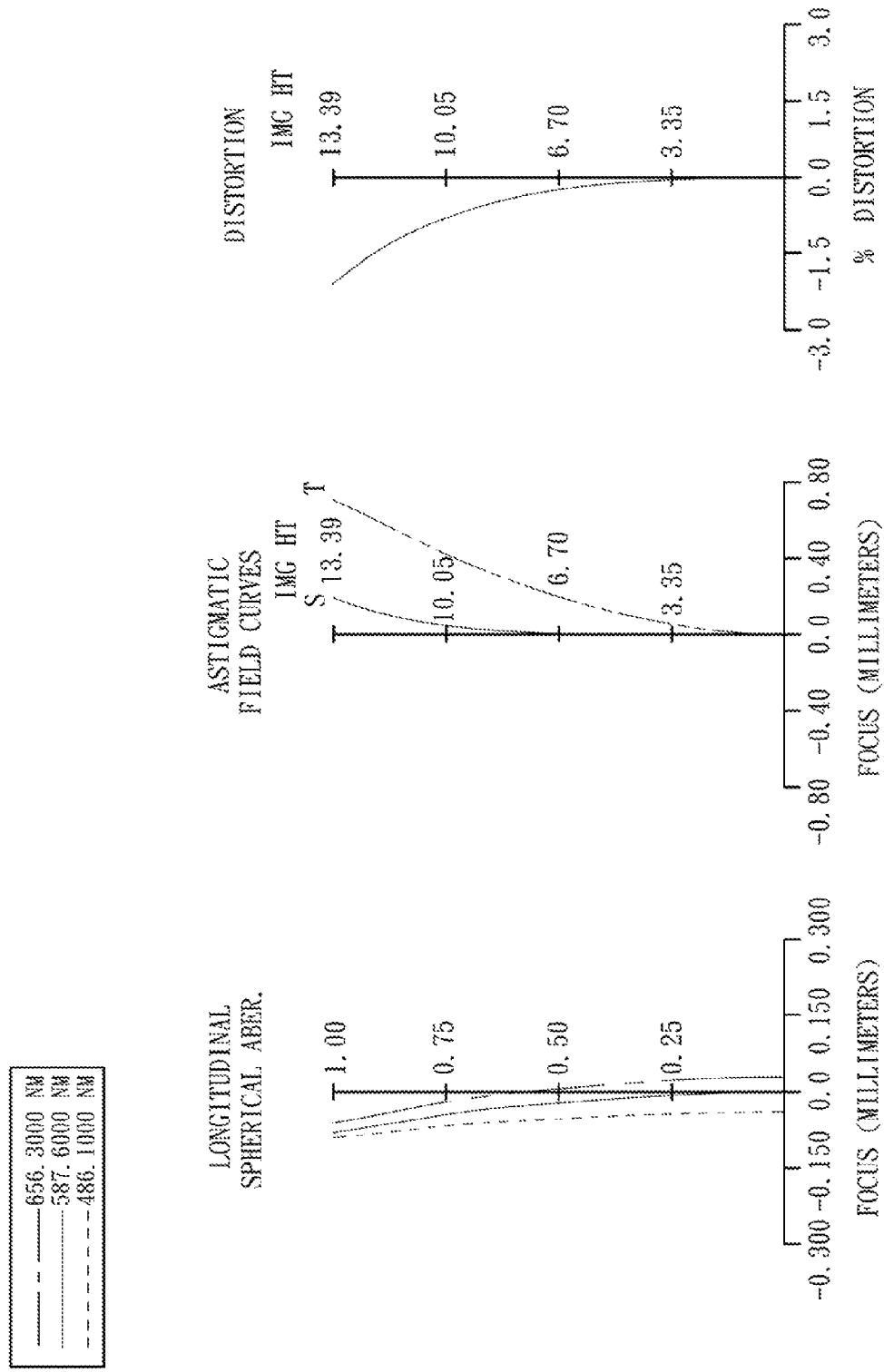
FIG. 2 shows spherical aberration curves, astigmatic field curves and distortion curve of the lens system according to the first embodiment.

FIG. 1 is a schematic view of a lens system according to the first embodiment. FIG. 2 shows spherical aberration curves, astigmatic field curves and distortion curve of the lens system according to the first embodiment. In FIG. 1, the lens system includes, in order from an object side to an image side, the first lens element 110, the second lens element 120, an aperture stop 100, the third lens element 130, the fourth lens element 140, the fifth lens element 150, an IR (infrared) cut filter 170 and an image plane 160.

The first lens element 110 is made of plastic material. The first lens element 110 with negative refractive power has a convex object-side surface 111 and a concave image-side surface 112. The object-side surface 111 and the image-side surface 112 of the first lens element 110 are aspheric.

The second lens element 120 is made of plastic material. The second lens element 120 with positive refractive power has a convex object-side surface 121 and a convex image-side surface 122. The object-side surface 121 and the image-side surface 122 of the second lens element 120 are aspheric.

The third lens element 130 is made of glass material. The third lens element 130 with positive refractive power has a convex object-side surface 131 and a convex image-side surface 132, wherein cement is located on the image-side surface 132 of the third lens element 130, so that the third lens element 130 can connect to the fourth lens element 140.

The fourth lens element 140 is made of glass material. The fourth lens element 140 with negative refractive power has a concave object-side surface 141 and a convex image-side surface 142, wherein the object-side surface 141 of the fourth lens element 140 is connected to the image-side surface 132 of the third lens element 130.

The fifth lens element 150 is made of glass material. The fifth lens element 150 with negative refractive power has a concave object-side surface 151 and a convex image-side surface 152.

The IR cut filter 170 is made of glass material and is located between the fifth lens element 150 and the image plane 160 with no influence on the focal length of the lens system.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_{i}(Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the lens system according to the first embodiment, f is a focal length of the lens system, Fno is an f-number of the lens system, HFOV is half of the maximal field of view, and they satisfy the following relationships:

$f=17.15$ mm;

$Fno=5.00$; and $HFOV=38.7$ degrees.

In the lens system according to the first embodiment, the refractive index of the third lens element is N3, and N3 satisfy the following relationship:

$N3=1.772$.

In the lens system according to the first embodiment, an axial distance between the second lens element 120 and the third lens element 130 is T23, a thickness of the third lens element 130 near the optical axis is CT3, and they satisfy the following relationship:

$T23/CT3=0.19$.

In the lens system according to the first embodiment, the focal length of the lens system is f, a curvature radius of the object-side surface 141 of the fourth lens element 140 is R7, a curvature radius of the image-side surface 142 of the fourth lens element 140 is R8, and they satisfy the following relationships:

$R7/f=-0.26$; and $R7/R8=0.60$.

In the lens system according to the first embodiment, a curvature radius of the object-side surface 131 of the third lens element 130 is R5, a curvature radius of the image-side surface 132 of the third lens element 130 is R6, and they satisfy the following relationship:

$(R5+R6)/(R5-R6)=0.78$.

In the lens system according to the first embodiment, the focal length of the lens system is f, a focal length of the first lens element 110 is f1, a focal length of the second lens element 120 is f2, a focal length of the third lens element 130 is f3, a composite focal length of the third lens element 130 and the fourth lens element 140 is f34, a focal length of the fifth lens element 150 is f5, and they satisfy the following relationships:

$|f/f2|=0.32$;

$f/f3=3.21$;

$f5/f1=0.15$;

$f/f34=1.95$; and $|f/f1|+|f/f2|=0.55$.

In the lens system according to the first embodiment, a half of a diagonal length of an effective photosensitive area of the image sensor is ImgH, an axial distance between the object-side surface 111 of the first lens element 110 and the image-side surface 152 of the fifth lens element 150 is Td, and they satisfy the following relationship:

$Td/ImgH=1.08$.

The detailed optical data of the first embodiment is shown in Table 1, and the aspheric surface data is shown in Table 2 as follows.

TABLE 1

1st Embodiment
f = 17.15 mm, Fno = 5.00, HFOV = 38.7 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 7.143600 (ASP) | 2.600 | Plastic | 1.583 | 30.2 | −76.61 |
| 2 | | 5.333200 (ASP) | 1.102 | | | | |
| 3 | Lens 2 | 37.379500 (ASP) | 0.787 | Plastic | 1.514 | 56.8 | 53.08 |
| 4 | | −99.998500 (ASP) | 0.378 | | | | |
| 5 | Ape. Stop | plano | 0.199 | | | | |
| 6 | Lens 3 | 35.903 | 3.073 | Glass | 1.772 | 49.6 | 5.35 |
| 7 | | −4.496 | 0.010 | Cement | | | |
| 8 | Lens 4 | −4.496 | 2.272 | Glass | 1.847 | 23.8 | −20.27 |
| 9 | | −7.503 | 3.164 | | | | |
| 10 | Lens 5 | −4.946 | 0.900 | Glass | 1.487 | 70.4 | −11.74 |
| 11 | | −38.642 | 4.000 | | | | |
| 12 | IR-filter | plano | 0.700 | Glass | 1.516 | 64.1 | — |
| 13 | | plano | 3.619 | | | | |
| 14 | Image | plano | — | | | | |

The reference wavelength (d-line) is 587.6 nm.

TABLE 2

Aspheric Coefficients

| Surface # | 1 | 2 | 3 | 4 |
|---|---|---|---|---|
| k = | 8.67676E−02 | 1.59858E+00 | −2.68490E+01 | −1.11994E+01 |
| A4 = | 3.14455E−05 | 2.00518E−04 | −2.64671E−03 | −3.85852E−03 |
| A6 = | 5.02475E−06 | 9.33922E−05 | −1.43816E−04 | −1.90894E−04 |
| A8 = | −1.26917E−07 | −9.98597E−06 | 1.46857E−06 | −1.32703E−05 |
| A10 = | | 2.07407E−06 | −2.94437E−06 | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A10 represent the aspheric coefficients ranging from the 1st order to the 10th. All labels for Tables of the remaining embodiments share the same definitions as those in Table 1 and Table 2 of the first embodiment, and their definitions will not be stated again.

Figure 3:
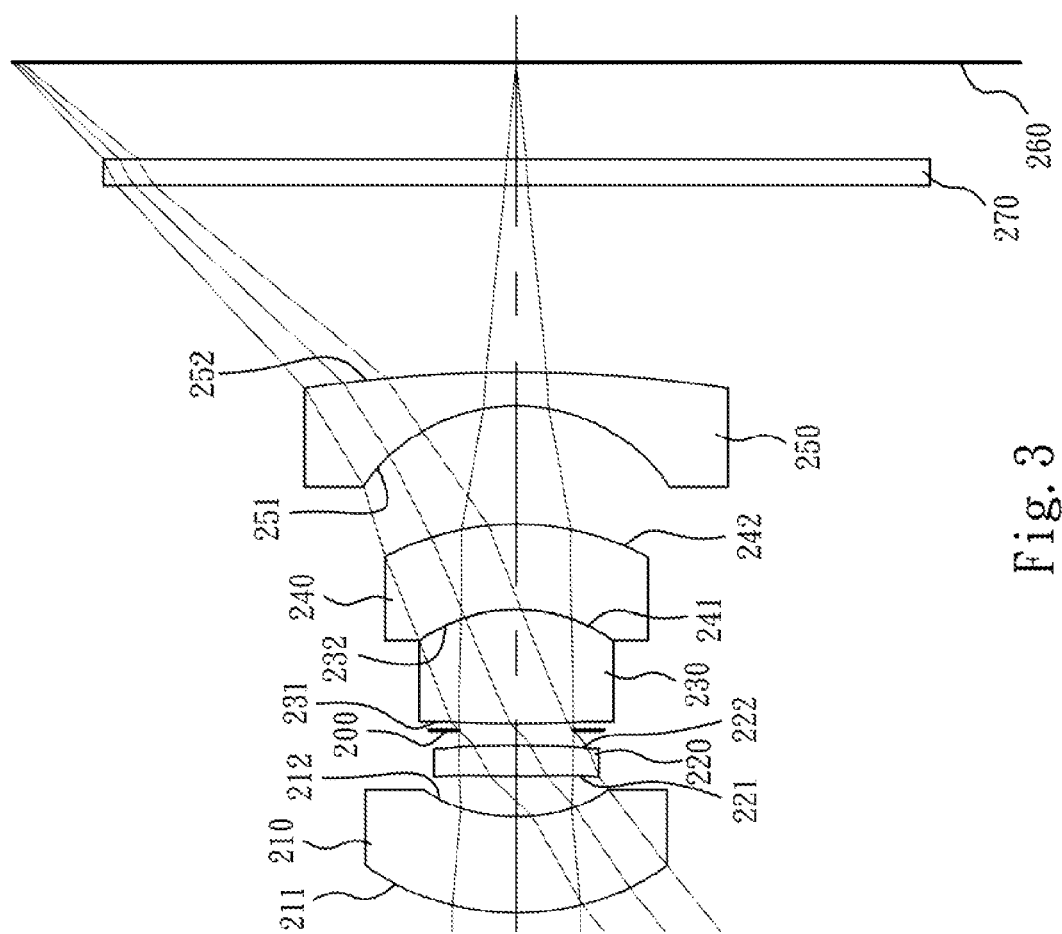
FIG. 3 is a schematic view of a lens system according to the second embodiment.
Figure 4:
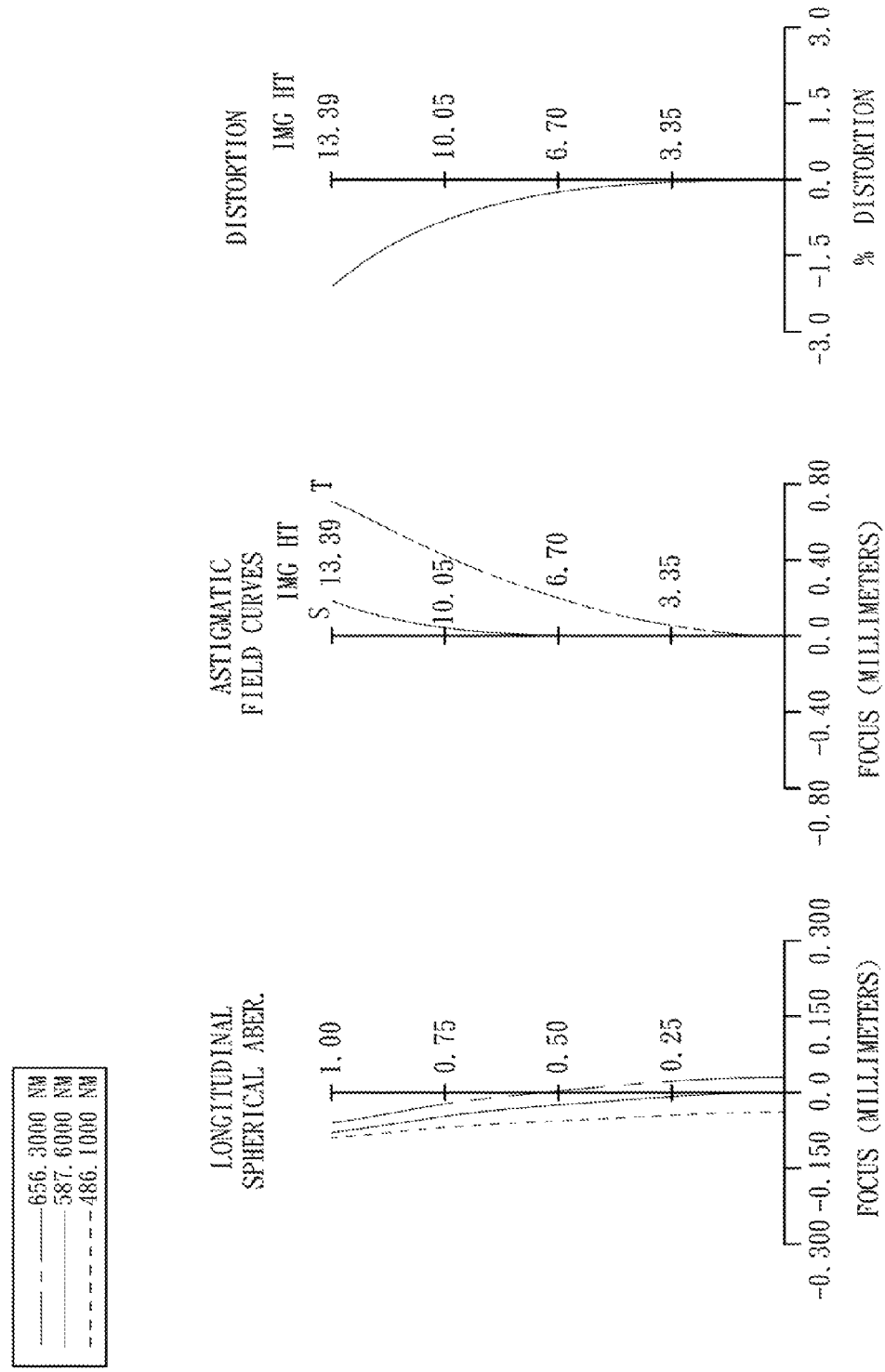
FIG. 4 shows spherical aberration curves, astigmatic field curves and distortion curve of the lens system according to the second embodiment.

FIG. 3 is a schematic view of a lens system according to the second embodiment. FIG. 4 shows spherical aberration curves, astigmatic field curves and distortion curve of the lens system according to the second embodiment. In FIG. 3, the lens system includes, in order from an object side to an image side, the first lens element 210, the second lens element 220, an aperture stop 200, the third lens element 230, the fourth lens element 240, the fifth lens element 250, an IR (infrared) cut filter 270 and an image plane 260.

The first lens element 210 is made of plastic material. The first lens element 210 with negative refractive power has a convex object-side surface 211 and a concave image-side surface 212. The object-side surface 211 and the image-side surface 212 of the first lens element 210 are aspheric.

The second lens element 220 is made of plastic material. The second lens element 220 with positive refractive power has a convex object-side surface 221 and a convex image-side surface 222. The object-side surface 221 and the image-side surface 222 of the second lens element 220 are aspheric.

The third lens element 230 is made of glass material. The third lens element 230 with positive refractive power has a convex object-side surface 231 and a convex image-side surface 232, wherein cement is located on the image-side surface 232 of the third lens element 230, so that the third lens element 230 can connect to the fourth lens element 240.

The fourth lens element 240 is made of glass material. The fourth lens element 240 with negative refractive power has a concave object-side surface 241 and a convex image-side surface 242, wherein the object-side surface 241 of the fourth lens element 240 is connected to the image-side surface 232 of the third lens element 230.

The fifth lens element 250 is made of glass material. The fifth lens element 250 with negative refractive power has a concave object-side surface 251 and a convex image-side surface 252.

The IR cut filter 270 is made of glass material and is located between the fifth lens element 250 and the image plane 260 with no influence on the focal length of the lens system.

The equation of the aspheric surface profiles of the aforementioned lens to elements of the second embodiment is the same as that of the first embodiment, and will not be stated herein again.

In the lens system according to the second embodiment, the definitions of f, Fno, HFOV, N3, T23, CT3, R5, R6, R7, R8, f1, f2, f3, f34, f5, Td and ImgH are the same as those stated in the first embodiment with corresponding values for the second embodiment, and they satisfy the following relationships:

| | | | |
|---|---|---|---|
| f(mm) | 17.15 | (R5 + R6)/(R5 − R6) | 0.78 |
| Fno | 5.00 | \|f/f2\| | 0.32 |
| HFOV(degrees) | 38.7 | f/f3 | 3.20 |
| N3 | 1.772 | f5/f1 | 0.15 |
| T23/CT3 | 0.19 | f/f34 | 1.94 |
| R7/f | −0.26 | \|f/f1\| + \|f/f2\| | 0.54 |
| R7/R8 | 0.60 | Td/ImgH | 1.08 |

The detailed optical data of the second embodiment is shown in Table 3, and the aspheric surface data is shown in Table 4 as follows.

TABLE 3

2nd Embodiment
f = 17.15 mm, Fno = 5.00, HFOV = 38.7 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 7.142200 (ASP) | 2.600 | Plastic | 1.583 | 30.2 | −78.20 |
| 2 | | 5.347100 (ASP) | 1.073 | | | | |
| 3 | Lens 2 | 39.421500 (ASP) | 0.826 | Plastic | 1.514 | 56.8 | 53.85 |
| 4 | | −91.977600 (ASP) | 0.397 | | | | |
| 5 | Ape. Stop | plano | 0.170 | | | | |
| 6 | Lens 3 | 35.652 | 3.060 | Glass | 1.772 | 49.6 | 5.36 |
| 7 | | −4.507 | 0.010 | Cement | | | |
| 8 | Lens 4 | −4.506 | 2.290 | Glass | 1.847 | 23.8 | −20.30 |
| 9 | | −7.530 | 3.170 | | | | |
| 10 | Lens 5 | −4.954 | 0.900 | Glass | 1.487 | 70.4 | −11.79 |
| 11 | | −37.909 | 5.000 | | | | |
| 12 | IR-filter | plano | 0.700 | Glass | 1.516 | 64.1 | — |
| 13 | | plano | 2.608 | | | | |
| 14 | Image | plano | — | | | | |

The reference wavelength (d-line) is 587.6 nm.

TABLE 4

Aspheric Coefficients

| Surface # | 1 | 2 | 3 | 4 |
|---|---|---|---|---|
| k = | −1.69735E−01 | 1.77460E+00 | 7.35998E+00 | −9.00000E+01 |
| A4 = | 1.25065E−04 | 9.82257E−05 | −2.57259E−03 | −3.76940E−03 |
| A6 = | 6.57459E−06 | 8.14013E−05 | −1.36673E−04 | −1.69435E−04 |
| A8 = | −6.10771E−08 | −9.82062E−06 | 5.21075E−06 | −1.41713E−05 |
| A10 = | | 1.92912E−06 | −3.09192E−06 | |

Figure 5:
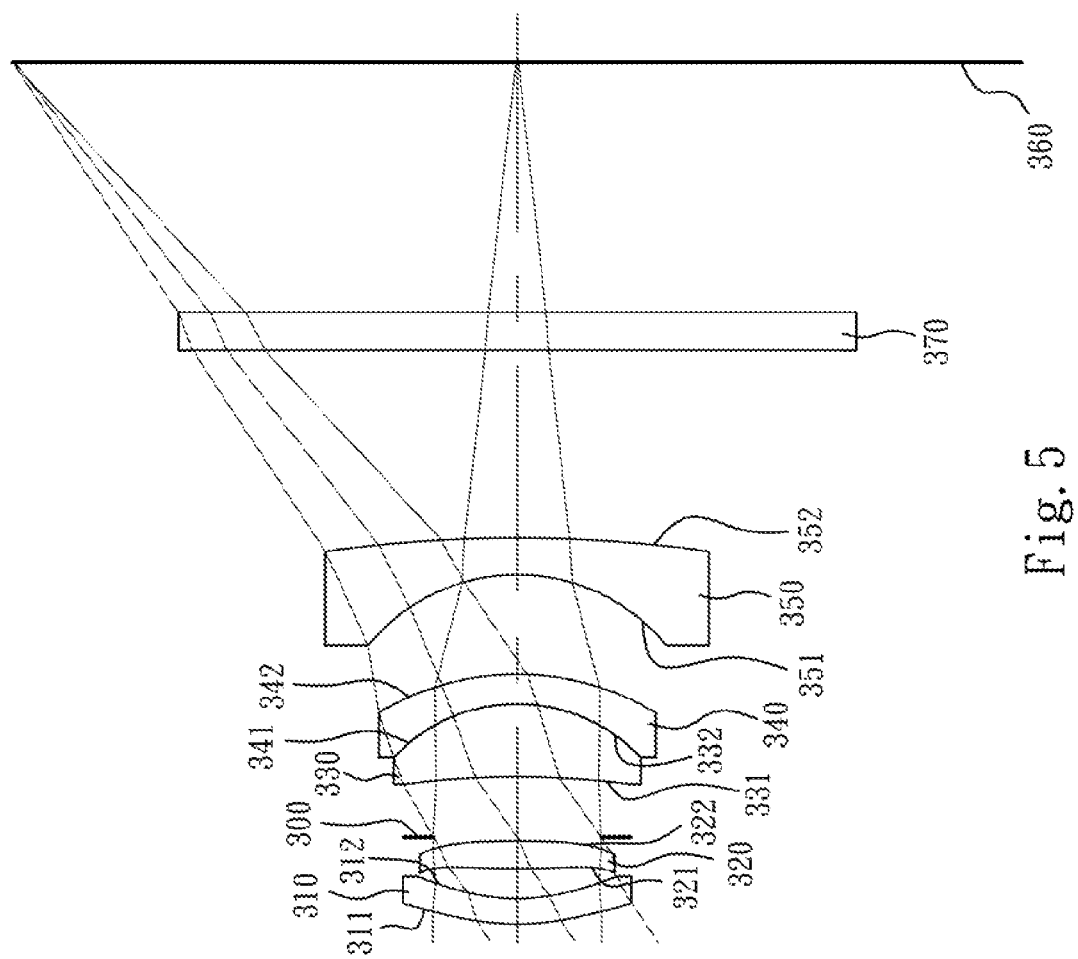
FIG. 5 is a schematic view of a lens system according to the third embodiment.
Figure 6:
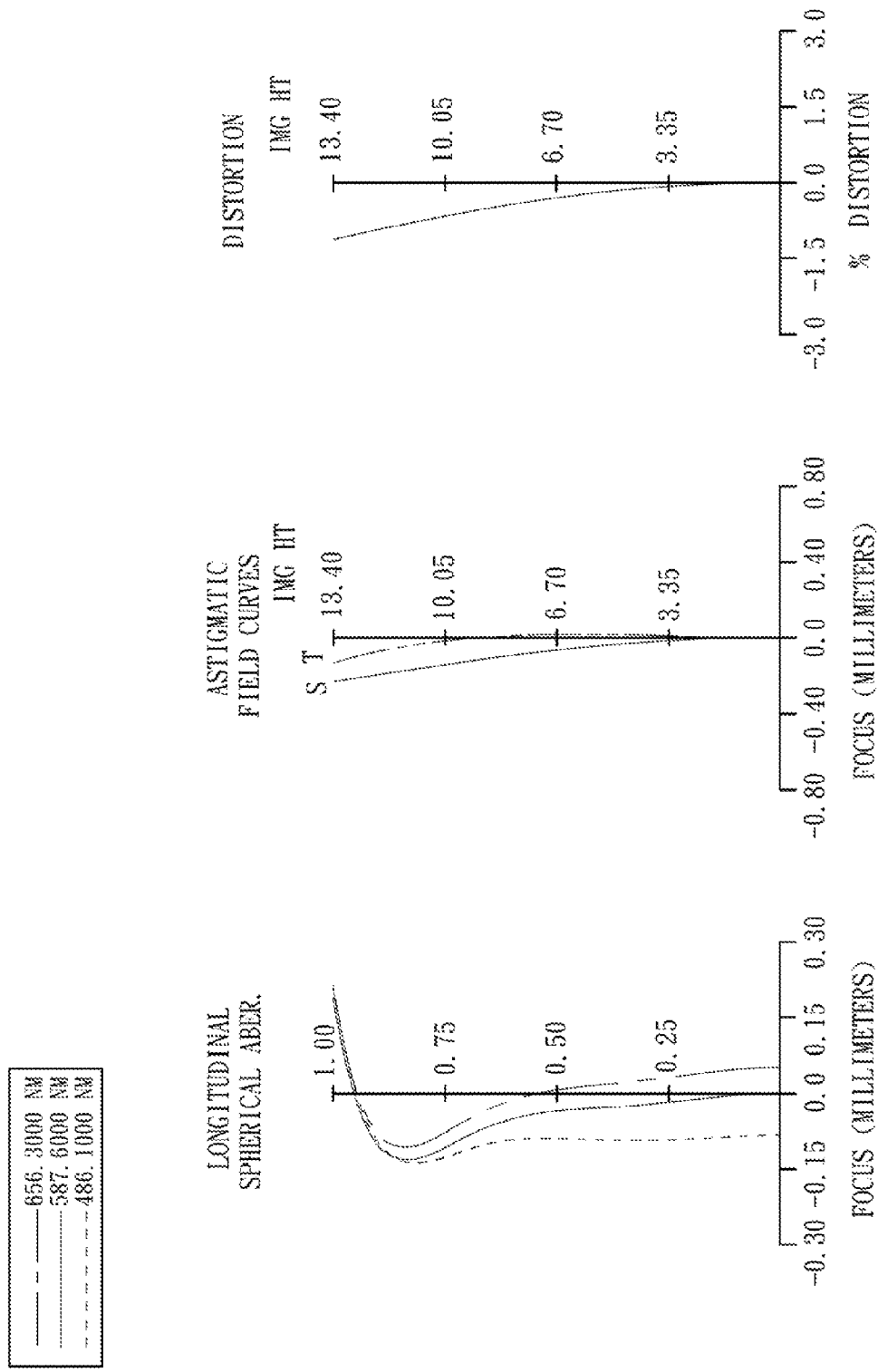
FIG. 6 shows spherical aberration curves, astigmatic field curves and distortion curve of the lens system according to the third embodiment.

FIG. 5 is a schematic view of a lens system according to the third embodiment. FIG. 6 shows spherical aberration curves, astigmatic field curves and distortion curve of the lens system according to the third embodiment. In FIG. 5, the lens system includes, in order from an object side to an image side, the first lens element 310, the second lens element 320, an aperture stop 300, the third lens element 330, the fourth lens element 340, the fifth lens element 350, an IR (infrared) cut filter 370 and an image plane 360.

The first lens element 310 is made of plastic material. The first lens element 310 with negative refractive power has a convex object-side surface 311 and a concave image-side surface 312. The object-side surface 311 and the image-side surface 312 of the first lens element 310 are aspheric.

The second lens element 320 is made of plastic material. The second lens element 320 with positive refractive power has a convex object-side surface 321 and a convex image-side surface 322. The object-side surface 321 and the image-side surface 322 of the second lens element 320 are aspheric.

The third lens element 330 is made of glass material. The third lens element 330 with positive refractive power has a concave object-side surface 331 and a convex image-side surface 332, wherein cement is located on the image-side surface 332 of the third lens element 330, so that the third lens element 330 can connect to the fourth lens element 340.

The fourth lens element 340 is made of glass material. The fourth lens element 340 with negative refractive power has a concave object-side surface 341 and a convex image-side surface 342, wherein the object-side surface 341 of the fourth lens element 340 is connected to the image-side surface 332 of the third lens element 330.

The fifth lens element 350 is made of glass material. The fifth lens element 350 with negative refractive power has a concave object-side surface 351 and a convex image-side surface 352.

The IR cut filter 370 is made of glass material and is located between the fifth lens element 350 and the image plane 360 with no influence on the focal length of the lens system.

The equation of the aspheric surface profiles of the aforementioned lens elements of the third embodiment is the same as that of the first embodiment, and will not be stated herein again.

In the lens system according to the third embodiment, the definitions of f, Fno, HFOV, N3, T23, CT3, R5, R6, R7, R8, f1, f2, f3, f34, f5, Td and ImgH are the same as those stated in the first embodiment with corresponding values for the third embodiment, and they satisfy the following relationships:

| | | | |
|---|---|---|---|
| f(mm) | 20.25 | (R5 + R6)/(R5 − R6) | 1.48 |
| Fno | 4.50 | \|f/f2\| | 0.93 |

-continued

| | | | |
|---|---|---|---|
| HFOV(degrees) | 33.9 | f/f3 | 3.04 |
| N3 | 1.804 | f5/f1 | 0.19 |
| T23/CT3 | 0.88 | f/f34 | 1.79 |
| R7/f | −0.22 | \|f/f1\| + \|f/f2\| | 1.25 |
| R7/R8 | 0.64 | Td/ImgH | 0.77 |

The detailed optical data of the third embodiment is shown in Table 5, and the aspheric surface data is shown in Table 6 as follows.

TABLE 5

3rd Embodiment
f = 20.25 mm, Fno = 4.50, HFOV = 33.9 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 6.384769 (ASP) | 0.700 | Plastic | 1.634 | 23.8 | −63.10 |
| 2 | | 5.271837 (ASP) | 0.800 | | | | |
| 3 | Lens 2 | 25.564796 (ASP) | 0.737 | Plastic | 1.544 | 55.9 | 21.72 |
| 4 | | −21.763909 (ASP) | 0.100 | | | | |
| 5 | Ape. Stop | plano | 1.607 | | | | |
| 6 | Lens 3 | −23.302 | 1.926 | Glass | 1.804 | 46.6 | 6.66 |
| 7 | | −4.512 | 0.010 | Cement | | | |
| 8 | Lens 4 | −4.512 | 0.800 | Glass | 1.762 | 26.5 | −18.96 |
| 9 | | −7.064 | 2.641 | | | | |
| 10 | Lens 5 | −5.147 | 1.000 | Glass | 1.516 | 64.1 | −11.74 |
| 11 | | −36.309 | 5.000 | | | | |
| 12 | IR-filter | plano | 1.000 | Glass | 1.516 | 64.1 | — |
| 13 | | plano | 6.691 | | | | |
| 14 | Image | plano | — | | | | |

The reference wavelength (d-line) is 587.6 nm.

TABLE 6

Aspheric Coefficients

| Surface # | 1 | 2 | 3 | 4 |
|---|---|---|---|---|
| k = | −5.16484E+00 | −3.25653E−01 | −2.45681E+00 | −4.63721E+01 |
| A4 = | −3.80899E−04 | −2.60992E−03 | −1.99124E−03 | −2.82139E−03 |
| A6 = | −1.09575E−04 | 1.80753E−05 | −1.55584E−04 | −4.32802E−05 |
| A8 = | 1.58216E−06 | −4.35828E−06 | −1.93613E−05 | −5.10908E−05 |
| A10 = | 9.49090E−07 | 1.58920E−06 | −5.17247E−06 | |

Figure 7:
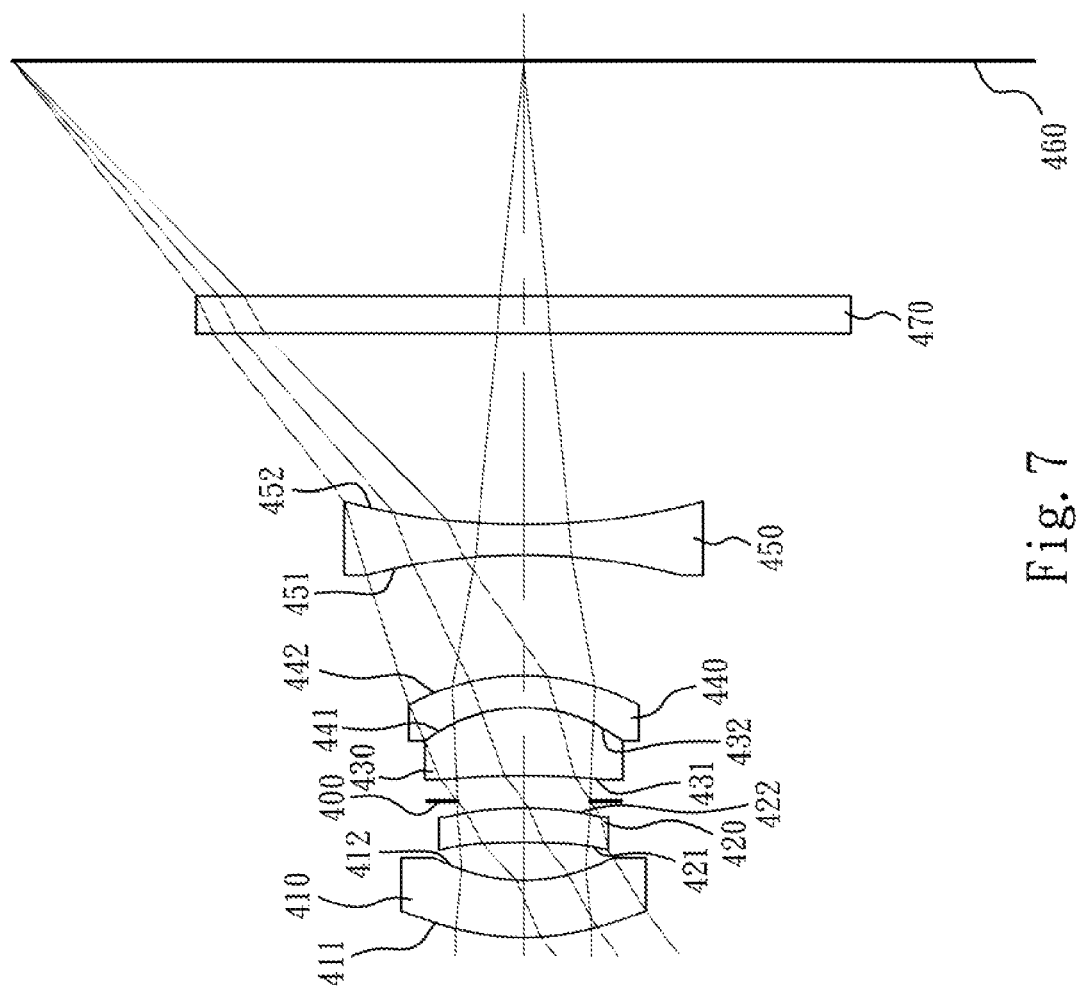
FIG. 7 is a schematic view of a lens system according to the fourth embodiment.
Figure 8:
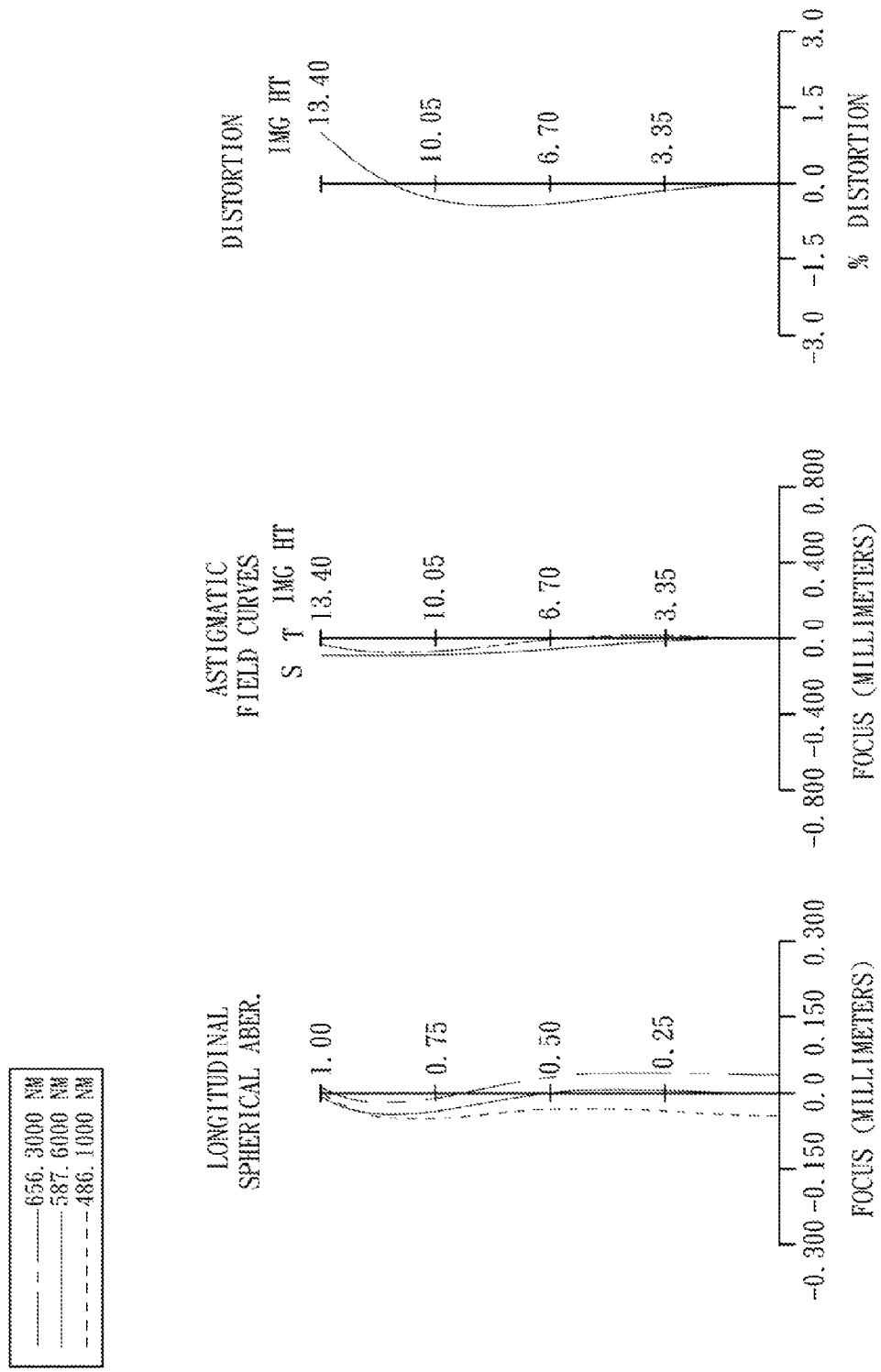
FIG. 8 shows spherical aberration curves, astigmatic field curves and distortion curve of the lens system according to the fourth embodiment.

FIG. 7 is a schematic view of a lens system according to the fourth embodiment. FIG. 8 shows spherical aberration curves, astigmatic field curves and distortion curve of the lens system according to the fourth embodiment. In FIG. 7, the lens system includes, in order from an object side to an image side, the first lens element 410, the second lens element 420, an aperture stop 400, the third lens element 430, the fourth lens element 440, the fifth lens element 450, an IR (infrared) cut filter 470 and an image plane 460.

The first lens element 410 is made of plastic material. The first lens element 410 with negative refractive power has a convex object-side surface 411 and a concave image-side surface 412. The object-side surface 411 and the image-side surface 412 of the first lens element 410 are aspheric.

The second lens element 420 is made of plastic material. The second lens element 420 with positive refractive power has a concave object-side surface 421 and a convex image-side surface 422. The object-side surface 421 and the image-side surface 422 of the second lens element 420 are aspheric.

The third lens element 430 is made of glass material. The third lens element 430 with positive refractive power has a concave object-side surface 431 and a convex image-side surface 432, wherein cement is located on the image-side surface 432 of the third lens element 430, so that the third lens element 430 can connect to the fourth lens element 440.

The fourth lens element 440 is made of glass material. The fourth lens element 440 with negative refractive power has a concave object-side surface 441 and a convex image-side surface 442, wherein the object-side surface 441 of the fourth lens element 440 is connected to the image-side surface 432 of the third lens element 430.

The fifth lens element 450 is made of glass material. The fifth lens element 450 with negative refractive power has a concave object-side surface 451 and a concave image-side surface 452.

The IR cut filter 470 is made of glass material and is located between the fifth lens element 450 and the image plane 460 with no influence on the focal length of the lens system.

The equation of the aspheric surface profiles of the aforementioned lens elements of the fourth embodiment is the same as that of the first embodiment, and will not be stated herein again.

In the lens system according to the fourth embodiment, the definitions of f, Fno, HFOV, N3, T23, CT3, R5, R6, R7, R8, f1, f2, f3, f34, f5, Td and ImgH are the same as those stated in the first embodiment with corresponding values for the fourth embodiment, and they satisfy the following relationships:

| | | | |
|---|---|---|---|
| f(mm) | 17.80 | (R5 + R6)/(R5 − R6) | 1.48 |
| Fno | 5.00 | \|f/f2\| | 0.49 |

-continued

| | | | |
|---|---|---|---|
| HFOV(degrees) | 36.7 | f/f3 | 2.84 |
| N3 | 1.804 | f5/f1 | 0.41 |
| T23/CT3 | 0.47 | f/f34 | 1.77 |
| R7/f | −0.24 | \|f/f1\| + \|f/f2\| | 0.93 |
| R7/R8 | 0.68 | Td/ImgH | 0.81 |

The detailed optical data of the fourth embodiment is shown in Table 7, and the aspheric surface data is shown in Table 8 as follows.

TABLE 7

4th Embodiment
f = 17.80 mm, Fno = 5.00, HFOV = 36.7 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 6.694125 (ASP) | 1.514 | Plastic | 1.632 | 23.4 | −40.49 |
| 2 | | 4.841278 (ASP) | 0.997 | | | | |
| 3 | Lens 2 | −21.090510 (ASP) | 0.900 | Plastic | 1.530 | 55.8 | 36.32 |
| 4 | | −10.212263 (ASP) | 0.183 | | | | |
| 5 | Ape. Stop | plano | 0.657 | | | | |
| 6 | Lens 3 | −21.874 | 1.776 | Glass | 1.804 | 46.6 | 6.28 |
| 7 | | −4.248 | 0.010 | Cement | | | |
| 8 | Lens 4 | −4.248 | 0.850 | Glass | 1.805 | 25.4 | −20.60 |
| 9 | | −6.220 | 3.162 | | | | |
| 10 | Lens 5 | −16.184 | 0.800 | Glass | 1.517 | 52.4 | −16.59 |
| 11 | | 18.590 | 5.000 | | | | |
| 12 | IR-filter | plano | 1.000 | Glass | 1.516 | 64.1 | — |
| 13 | | plano | 6.163 | | | | |
| 14 | Image | plano | — | | | | |

The reference wavelength (d-line) is 587.6 nm.

TABLE 8

Aspheric Coefficients

| Surface # | 1 | 2 | 3 | 4 |
|---|---|---|---|---|
| k = | −2.38502E+00 | −2.00055E−01 | −5.58804E−01 | −5.90842E+00 |
| A4 = | 5.28691E−05 | −2.64553E−04 | −2.35779E−03 | −2.19457E−03 |
| A6 = | −1.40525E−05 | 1.87320E−05 | −1.40142E−04 | −1.80958E−04 |
| A8 = | −3.73401E−06 | −7.19695E−06 | −3.68101E−05 | −3.78175E−06 |
| A10 = | 3.69817E−07 | 1.18746E−06 | 1.65104E−06 | |

Figure 9:
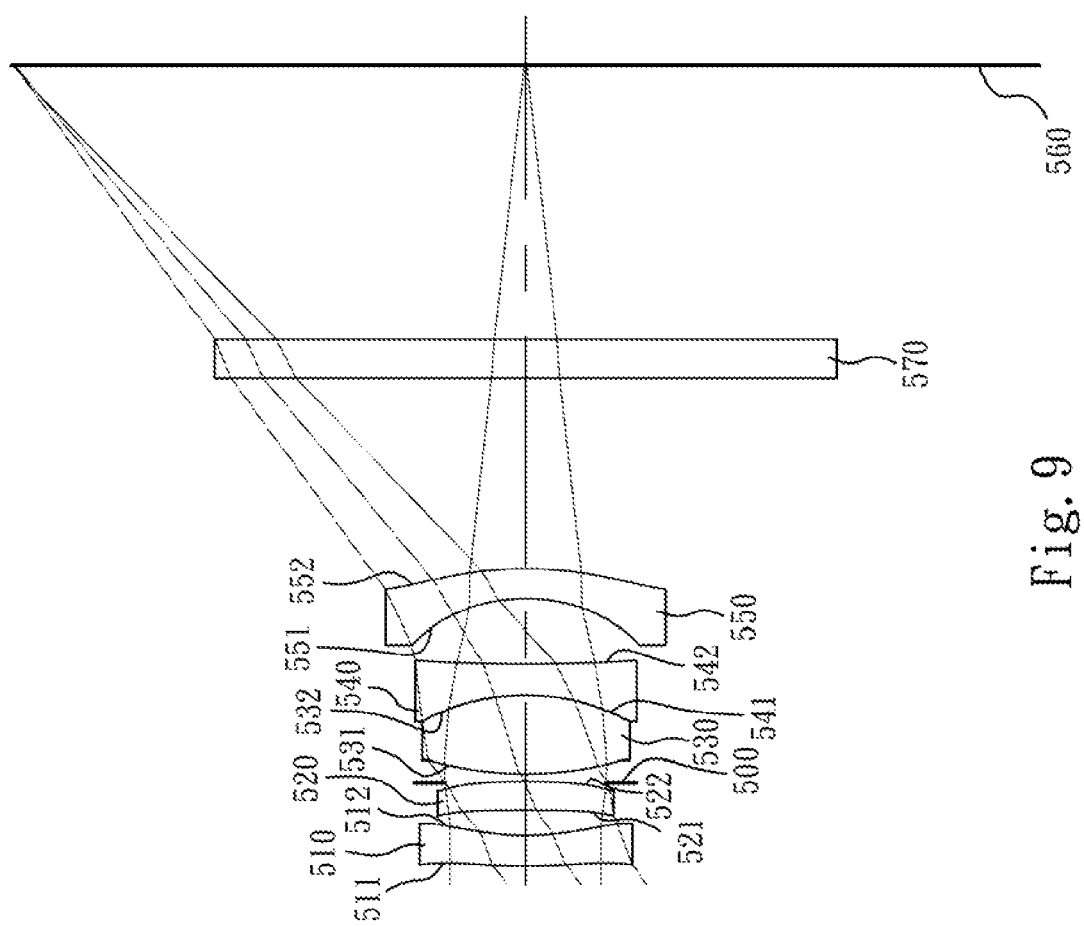
FIG. 9 is a schematic view of a lens system according to the fifth embodiment.
Figure 10:
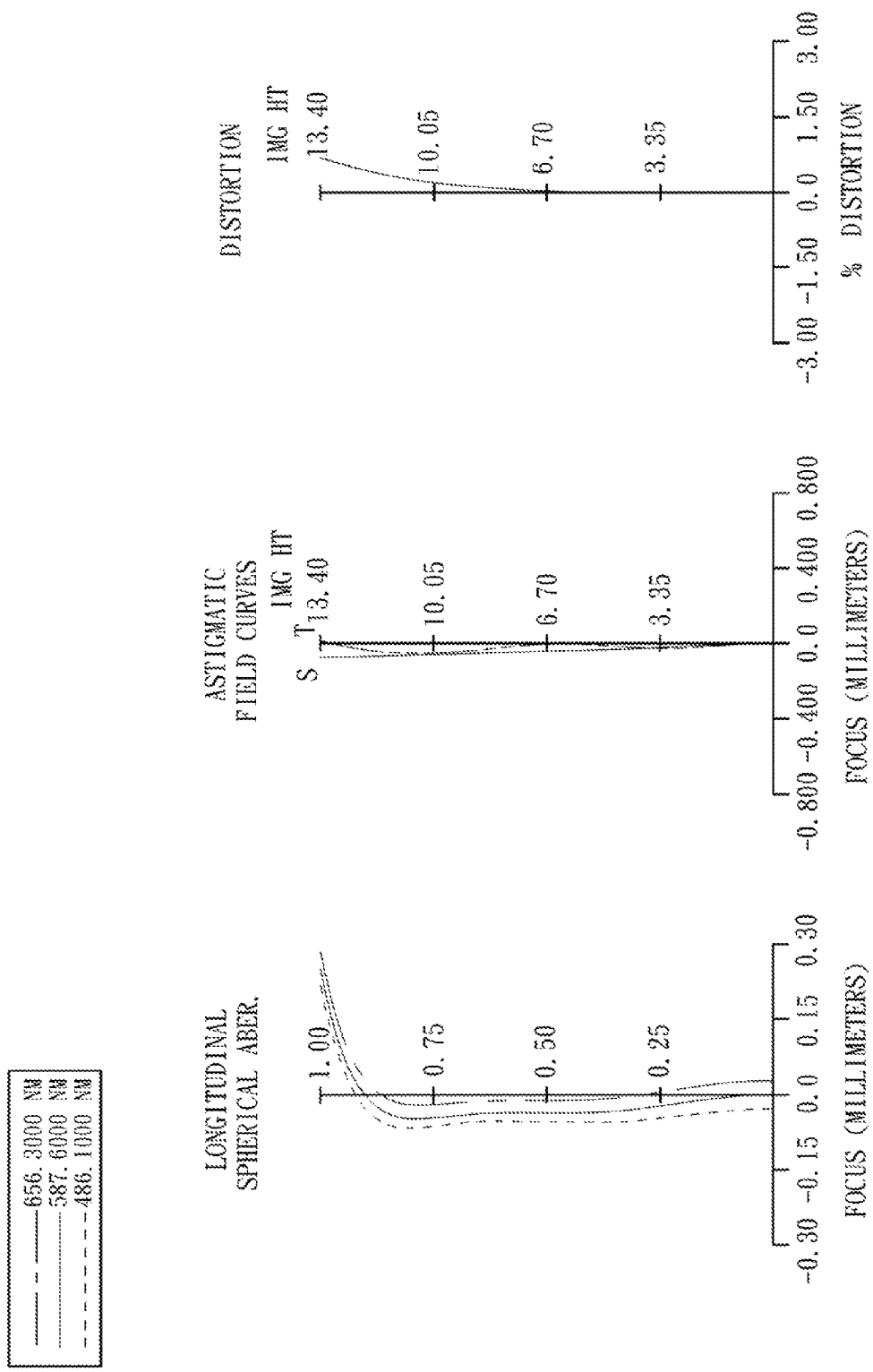
FIG. 10 shows spherical aberration curves, astigmatic field curves and distortion curve of the lens system according to the fifth embodiment.

FIG. 9 is a schematic view of a lens system according to the fifth embodiment. FIG. 10 shows spherical aberration curves, astigmatic field curves and distortion curve of the lens system according to the fifth embodiment. In FIG. 9, the lens system includes, in order from an object side to an image side, the first lens element 510, the second lens element 520, an aperture stop 500, the third lens element 530, the fourth lens element 540, the fifth lens element 550, an IR (infrared) cut filter 570 and an image plane 560.

The first lens element 510 is made of plastic material. The first lens element 510 with negative refractive power has a convex object-side surface 511 and a concave image-side surface 512. The object-side surface 511 and the image-side surface 512 of the first lens element 510 are aspheric.

The second lens element 520 is made of plastic material. The second lens element 520 with positive refractive power has a concave object-side surface 521 and a convex image-side surface 522. The object-side surface 521 and the image-side surface 522 of the second lens element 520 are aspheric.

The third lens element 530 is made of glass material. The third lens element 530 with positive refractive power has a convex object-side surface 531 and a convex image-side surface 532, wherein cement is located on the image-side surface 532 of the third lens element 530, so that the third lens element 530 can connect to the fourth lens element 540.

The fourth lens element 540 is made of glass material. The fourth lens element 540 with negative refractive power has a concave object-side surface 541 and a concave image-side surface 542, wherein the object-side surface 541 of the fourth lens element 540 is connected to the image-side surface 532 of the third lens element 530.

The fifth lens element 550 is made of plastic material. The fifth lens element 550 with negative refractive power has a concave object-side surface 551 and a convex image-side surface 552. The object-side surface 551 and the image-side surface 552 of the fifth lens element 550 are aspheric.

The IR cut filter 570 is made of glass material and is located between the fifth lens element 550 and the image plane 560 with no influence on the focal length of the lens system.

The equation of the aspheric surface profiles of the aforementioned lens elements of the fifth embodiment is the same as that of the first embodiment, as and will not be stated herein again.

In the lens system according to the fifth embodiment, the definitions of f, Fno, HFOV, N3, T23, CT3, R5, R6, R7, R8, f1, f2, f3, f34, f5, Td and ImgH are the same as those stated in the first embodiment with corresponding values for the fifth embodiment, and they satisfy the following relationships:

| | | | |
|---|---|---|---|
| f(mm) | 17.82 | (R5 + R6)/(R5 − R6) | 0.25 |
| Fno | 4.50 | \|f/f2\| | 0.36 |
| HFOV(degrees) | 36.8 | f/f3 | 3.86 |
| N3 | 1.804 | f5/f1 | 0.80 |
| T23/CT3 | 0.10 | f/f34 | 2.14 |
| R7/f | −0.31 | \|f/f1\| + \|f/f2\| | 1.18 |
| R7/R8 | −0.13 | Td/ImgH | 0.58 |

The detailed optical data of the fifth embodiment is shown in Table 9, and the aspheric surface data is shown in Table 10 as follows.

TABLE 9

5th Embodiment
f = 17.82 mm, Fno = 4.50, HFOV = 36.8 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 11.192840 (ASP) | 0.800 | Plastic | 1.632 | 23.4 | −21.88 |
| 2 | | 6.014470 (ASP) | 0.671 | | | | |
| 3 | Lens 2 | −52.292075 (ASP) | 0.750 | Plastic | 1.530 | 55.8 | 49.24 |
| 4 | | −17.494224 (ASP) | −0.034 | | | | |
| 5 | Ape. Stop | plano | 0.233 | | | | |
| 6 | Lens 3 | 9.307 | 2.062 | Glass | 1.804 | 46.6 | 4.62 |
| 7 | | −5.568 | 0.010 | Cement | | | |
| 8 | Lens 4 | −5.568 | 0.810 | Glass | 1.532 | 48.8 | −9.23 |
| 9 | | 43.679 | 1.702 | | | | |
| 10 | Lens 5 | −4.774153 (ASP) | 0.800 | Plastic | 1.583 | 30.2 | −17.56 |
| 11 | | −9.491835 (ASP) | 5.000 | | | | |
| 12 | IR-filter | plano | 1.000 | Glass | 1.516 | 64.1 | — |
| 13 | | plano | 7.206 | | | | |
| 14 | Image | plano | — | | | | |

The reference wavelength (d-line) is 587.6 nm.

TABLE 10

Aspheric Coefficients

| Surface # | 1 | 2 | 3 |
|---|---|---|---|
| k = | 1.88911E+00 | −3.71893E+00 | 2.42607E−01 |
| A4 = | −7.07699E−03 | −5.23734E−03 | −9.50157E−04 |
| A6 = | 2.81899E−06 | −4.78102E−05 | −4.95224E−04 |
| A8 = | 4.51620E−05 | 6.68746E−05 | 1.77886E−05 |
| A10 = | −2.00390E−06 | −1.32854E−06 | −3.51424E−06 |

| Surface # | 4 | 10 | 11 |
|---|---|---|---|
| k = | 4.46678E+00 | −6.91868E+00 | −8.78207E−01 |
| A4 = | −2.01896E−03 | −9.36747E−03 | 7.21433E−05 |
| A6 = | −2.46313E−04 | 6.23622E−04 | 3.04539E−05 |
| A8 = | −2.58468E−05 | −6.32861E−05 | 3.44323E−06 |
| A10 = | | 2.77149E−06 | −9.78976E−08 |

Figure 11:
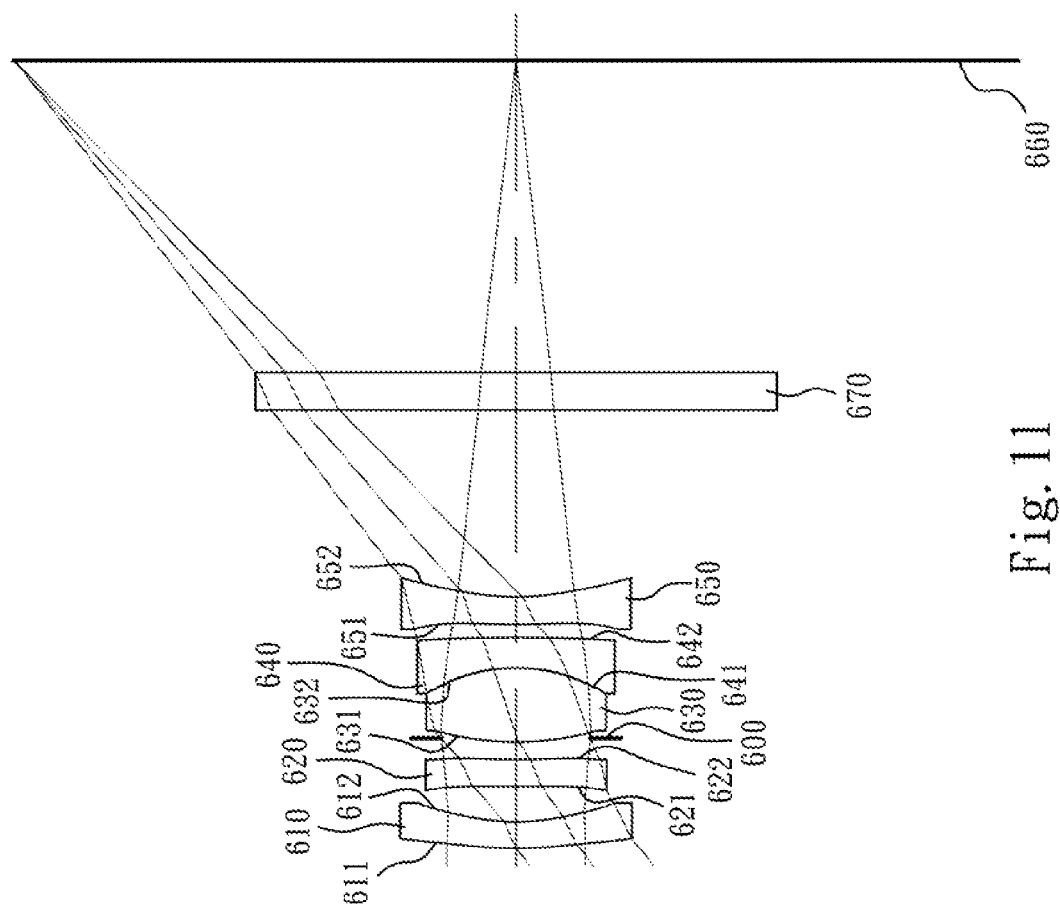
FIG. 11 is a schematic view of a lens system according to the sixth embodiment.
Figure 12:
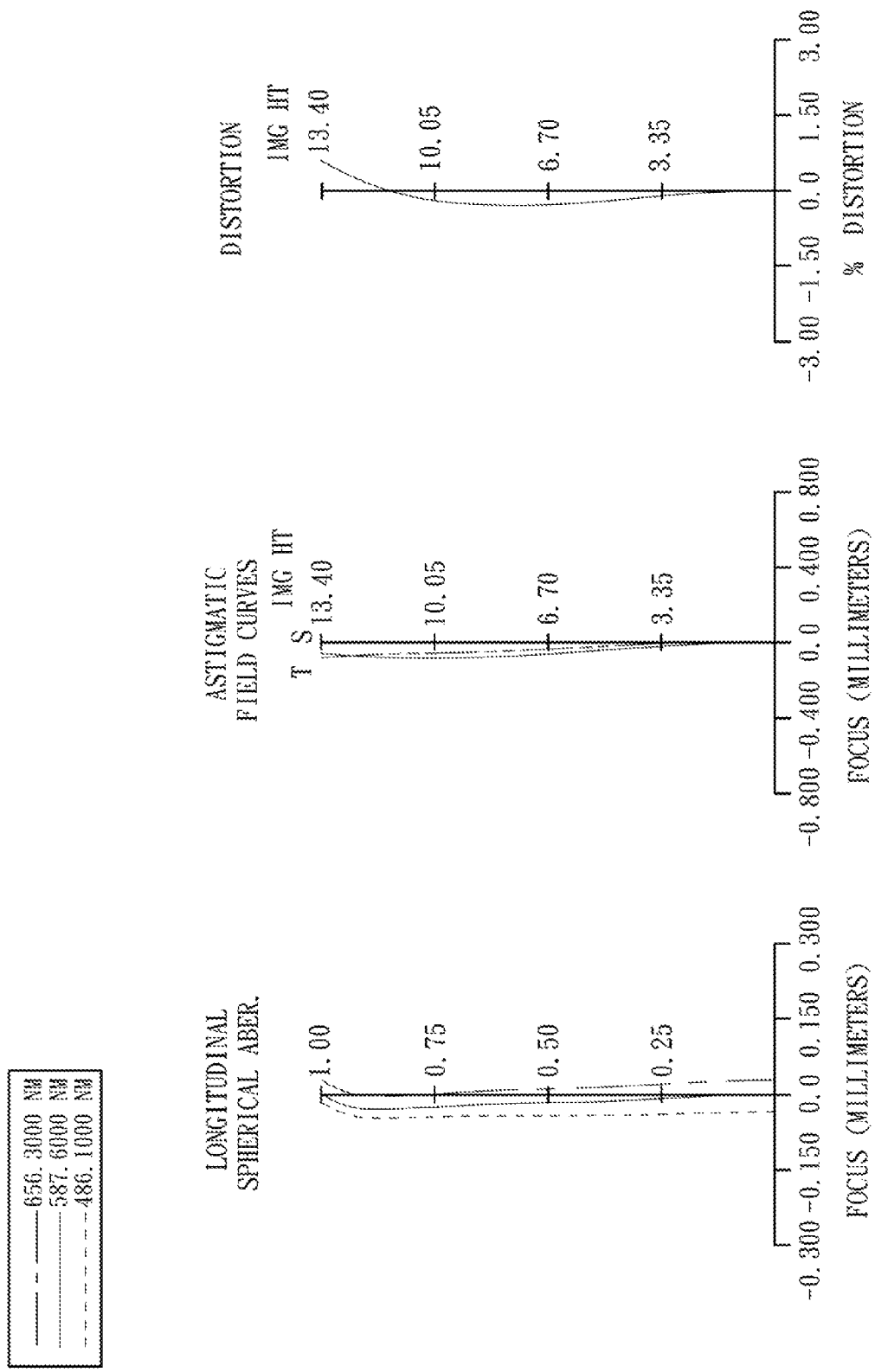
FIG. 12 shows spherical aberration curves, astigmatic field curves and distortion curve of the lens system according to the sixth embodiment.

FIG. 11 is a schematic view of a lens system according to the sixth embodiment. FIG. 12 shows spherical aberration curves, astigmatic field curves and distortion curve of the lens system according to the sixth embodiment. In FIG. 11, the lens system includes, in order from an object side to an image side, the first lens element 610, the second lens element 620, an aperture stop 600, the third lens element 630, the fourth lens element 640, the fifth lens element 650, an IR (infrared) cut filter 670 and an image plane 660.

The first lens element 610 is made of plastic material. The first lens element 610 with negative refractive power has a convex object-side surface 611 and a concave image-side surface 612. The object-side surface 611 and the image-side surface 612 of the first lens element 610 are aspheric.

The second lens element 620 is made of plastic material. The second lens element 620 with negative refractive power has a convex object-side surface 621 and a concave image-side surface 622. The object-side surface 621 and the image-side surface 622 of the second lens element 620 are aspheric.

The third lens element 630 is made of glass material. The third lens element 630 with positive refractive power has a convex object-side surface 631 and a convex image-side surface 632, wherein cement is located on the image-side surface 632 of the third lens element 630, so that the third lens element 630 can connect to the fourth lens element 640.

The fourth lens element 640 is made of glass material. The fourth lens element 640 with negative refractive power has a concave object-side surface 641 and a convex image-side surface 642, wherein the object-side surface 641 of the fourth lens element 640 is connected to the image-side surface 632 of the third lens element 630.

The fifth lens element 650 is made of plastic material. The fifth lens element 650 with negative refractive power has a convex object-side surface 651 and a concave image-side surface 652. The object-side surface 651 and the image-side surface 652 of the fifth lens element 650 are aspheric.

The IR cut filter 670 is made of glass material and is located between the fifth lens element 650 and the image plane 660 with no influence on the focal length of the lens system.

The equation of the aspheric surface profiles of the aforementioned lens elements of the sixth embodiment is the same as that of the first embodiment, and will not be stated herein again.

In the lens system according to the sixth embodiment, the definitions of f, Fno, HFOV, N3, T23, CT3, R5, R6, R7, R8, f1, f2, f3, f34, f5, Td and ImgH are the same as those stated in the first embodiment with corresponding values for the sixth embodiment, and they satisfy the following relationships:

| | | | |
|---|---|---|---|
| f(mm) | 16.57 | (R5 + R6)/(R5 − R6) | 0.29 |
| Fno | 4.50 | \|f/f2\| | 0.24 |
| HFOV(degrees) | 38.8 | f/f3 | 4.27 |
| N3 | 1.804 | f5/f1 | 0.68 |
| T23/CT3 | 0.23 | f/f34 | 2.54 |
| R7/f | −0.27 | \|f/f1\| + \|f/f2\| | 0.90 |
| R7/R8 | 0.10 | Td/ImgH | 0.50 |

The detailed optical data of the sixth embodiment is shown in Table 11, and the aspheric surface data is shown in Table 12 as follows.

TABLE 11

6th Embodiment
f = 16.57 mm, Fno = 4.50, HFOV = 38.8 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 9.469362 (ASP) | 0.710 | Plastic | 1.583 | 30.2 | −24.81 |
| 2 | | 5.566057 (ASP) | 0.944 | | | | |
| 3 | Lens 2 | 50.659341 (ASP) | 0.720 | Plastic | 1.530 | 55.8 | −70.50 |
| 4 | | 21.397761 (ASP) | 0.545 | | | | |
| 5 | Ape. Stop | plano | −0.093 | | | | |
| 6 | Lens 3 | 8.168 | 1.980 | Glass | 1.804 | 46.6 | 3.88 |
| 7 | | −4.504 | 0.010 | Cement | | | |
| 8 | Lens 4 | −4.504 | 0.810 | Glass | 1.581 | 40.7 | −8.67 |
| 9 | | −45.053 | 0.352 | | | | |
| 10 | Lens 5 | 19.029496 (ASP) | 0.710 | Plastic | 1.583 | 30.2 | −16.87 |
| 11 | | 6.397628 (ASP) | 5.000 | | | | |
| 12 | IR-filter | plano | 1.000 | Glass | 1.516 | 64.1 | — |
| 13 | | plano | 8.330 | | | | |
| 14 | Image | plano | — | | | | |

The reference wavelength (d-line) is 587.6 nm.

TABLE 12

Aspheric Coefficients

| Surface # | 1 | 2 | 3 |
|---|---|---|---|
| k = | −1.00000E+01 | −3.67693E+00 | −1.00000E+01 |
| A4 = | −3.65108E−03 | −3.50157E−03 | −5.05694E−03 |
| A6 = | 1.33018E−04 | 2.29848E−04 | −9.11246E−05 |
| A8 = | 1.30293E−05 | 1.48081E−05 | 2.34207E−05 |
| A10 = | −6.18718E−07 | 9.13943E−07 | −1.83946E−06 |

| Surface # | 4 | 10 | 11 |
|---|---|---|---|
| k = | −9.48843E+00 | −7.68552E+00 | −2.83585E+00 |
| A4 = | −5.09814E−03 | −6.06185E−03 | −3.20511E−03 |
| A6 = | 1.53902E−05 | 2.88761E−05 | 1.20522E−04 |
| A8 = | −5.71998E−08 | −3.36083E−06 | 4.88558E−06 |
| A10 = | | 2.82971E−07 | −2.45632E−07 |

Figure 13:
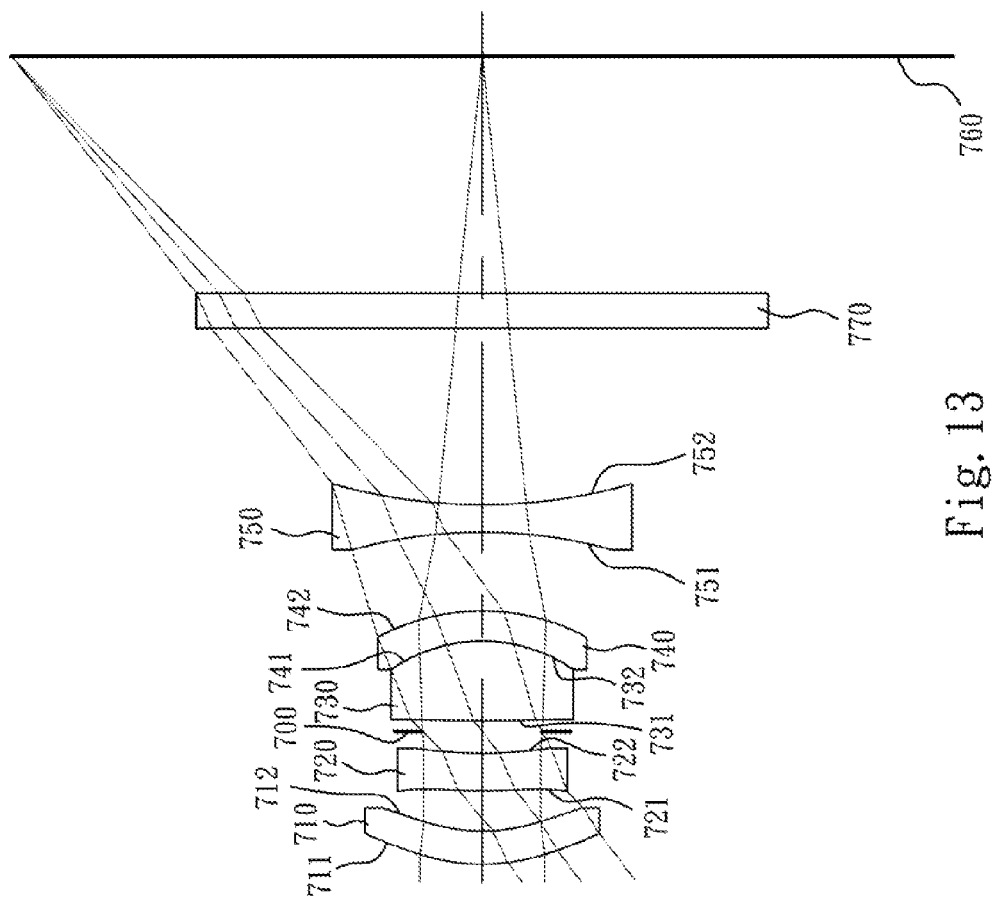
FIG. 13 is a schematic view of a lens system according to the seventh embodiment.
Figure 14:
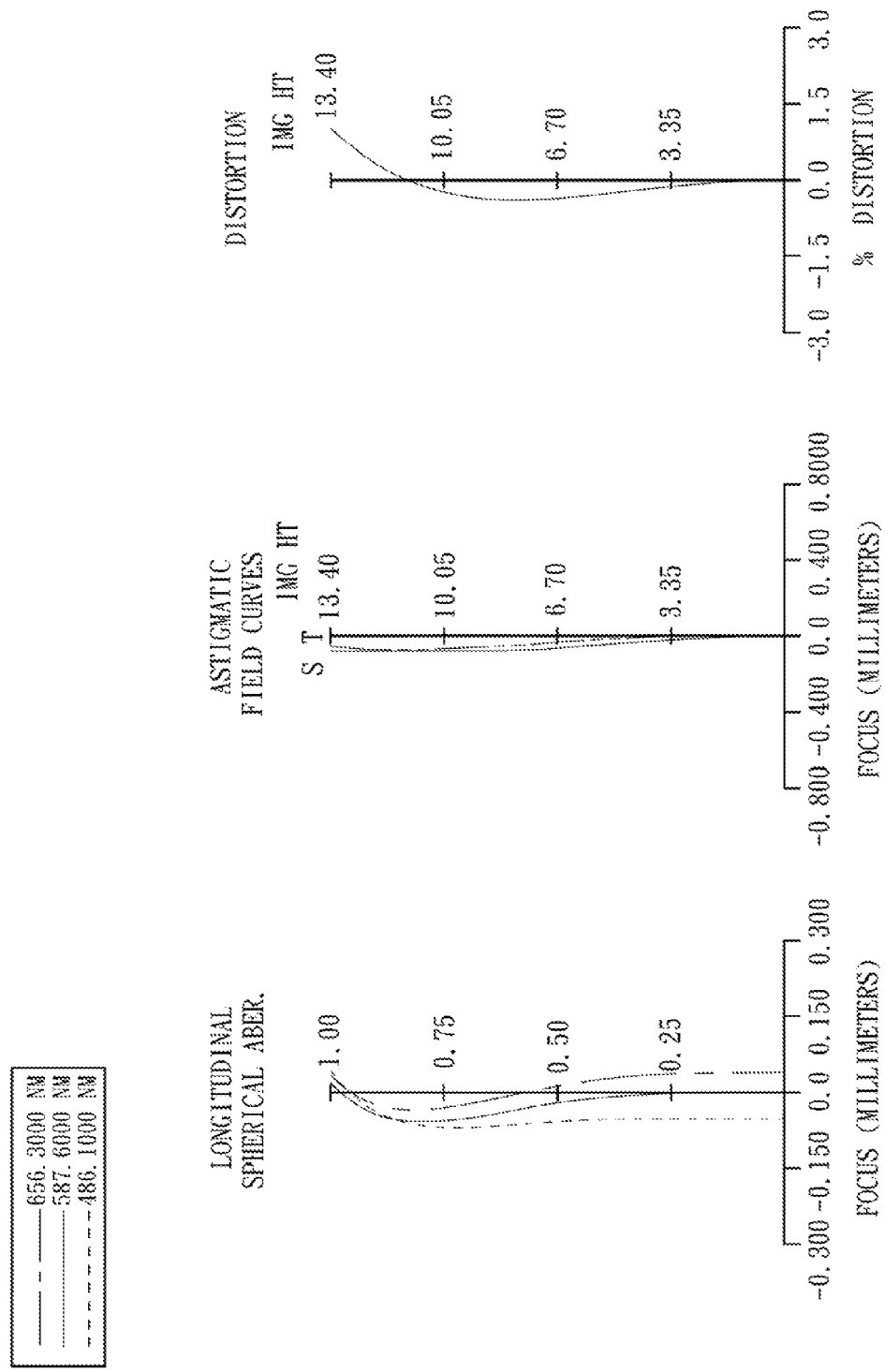
FIG. 14 shows spherical aberration curves, astigmatic field curves and distortion curve of the lens system according to the seventh embodiment.

FIG. 13 is a schematic view of a lens system according to the seventh embodiment. FIG. 14 shows spherical aberration curves, astigmatic field curves and distortion curve of the lens system according to the seventh embodiment. In FIG. 13, the lens system includes, in order from an object side to an image side, the first lens element 710, the second lens element 720, an aperture stop 700, the third lens element 730, the fourth lens element 740, the fifth lens element 750, an IR (infrared) cut filter 770 and an image plane 760.

The first lens element 710 is made of plastic material. The first lens element 710 with negative refractive power has a convex object-side surface 711 and a concave image-side surface 712. The object-side surface 711 and the image-side surface 712 of the first lens element 710 are aspheric.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

The third lens element 730 is made of glass material. The third lens element 730 with positive refractive power has a convex object-side surface 731 and a convex image-side surface 732, wherein cement is located on the image-side surface 732 of the third lens element 730, so that the third lens element 730 can connect to the fourth lens element 740.

The fourth lens element 740 is made of glass material. The fourth lens element 740 with negative refractive power has a concave object-side surface 741 and a convex image-side surface 742, wherein the object-side surface 741 of the fourth lens element 740 is connected to the image-side surface 732 of the third lens element 730.

The fifth lens element 750 is made of glass material. The fifth lens element 750 with negative refractive power has a concave object-side surface 751 and a concave image-side surface 752.

The IR cut filter 770 is made of glass material and is located between the fifth lens element 750 and the image plane 760 with no influence on the focal length of the lens system.

The equation of the aspheric surface profiles of the aforementioned lens elements of the seventh embodiment is the same as that of the first embodiment, and will not be stated herein again.

In the lens system according to the seventh embodiment, the definitions of f, Fno, HFOV, N3, T23, CT3, R5, R6, R7, R8, f1, f2, f3, f34, f5, Td and ImgH are the same as those stated in the first embodiment with corresponding values for the seventh embodiment, and they satisfy the following relationships:

| f(mm) | 17.71 | (R5 + R6)/(R5 − R6) | 0.87 |
| --- | --- | --- | --- |
| Fno | 5.00 | |f/f2| | 0.50 |
| HFOV(degrees) | 36.9 | f/f3 | 3.39 |
| N3 | 1.804 | f5/f1 | 0.06 |
| T23/CT3 | 0.41 | f/f34 | 2.44 |
| R7/f | −0.25 | |f/f1| + |f/f2| | 0.57 |
| R7/R8 | 0.71 | Td/ImgH | 0.76 |

The detailed optical data of the seventh embodiment is shown in Table 13, and the aspheric surface data is shown in Table 14 as follows.

TABLE 13

7th Embodiment
f = 17.71 mm, Fno = 5.00, HFOV = 36.9 deg.

| Surface # | | Curvature Radius | Thickness | Material | Index | Abbe # | Focal length |
| --- | --- | --- | --- | --- | --- | --- | --- |
| 0 | Object | plano | Infinity | | | | |
| 1 | Lens 1 | 5.558332 (ASP) | 0.961 | Plastic | 1.632 | 23.4 | −229.05 |
| 2 | | 4.994426 (ASP) | 1.148 | | | | |
| 3 | Lens 2 | 24.213075 (ASP) | 1.066 | Plastic | 1.632 | 23.4 | −35.63 |
| 4 | | 11.468100 (ASP) | 0.619 | | | | |
| 5 | Ape. Stop | plano | 0.305 | | | | |
| 6 | Lens 3 | 61.350 | 2.266 | Glass | 1.804 | 46.6 | 5.23 |
| 7 | | −4.436 | 0.010 | Cement | | | |
| 8 | Lens 4 | −4.436 | 0.850 | Glass | 1.805 | 25.4 | −23.53 |
| 9 | | −6.288 | 2.224 | | | | |
| 10 | Lens 5 | −13.915 | 0.800 | Glass | 1.517 | 52.4 | −14.09 |
| 11 | | 15.602 | 5.000 | | | | |
| 12 | IR-filter | plano | 1.000 | Glass | 1.516 | 64.1 | — |
| 13 | | plano | 6.763 | | | | |
| 14 | Image | plano | — | | | | |

The reference wavelength (d-line) is 587.6 nm.

TABLE 14

Aspheric Coefficients

| Surface # | 1 | 2 | 3 | 4 |
| --- | --- | --- | --- | --- |
| k = | −1.68322E+00 | −7.73989E−01 | −1.00000E+01 | −9.73293E+00 |
| A4 = | 1.25989E−04 | −9.80013E−04 | −2.54130E−03 | −1.00256E−04 |
| A6 = | −4.42116E−05 | −1.37594E−04 | −2.62058E−04 | −2.32450E−04 |
| A8 = | −4.17555E−06 | −1.75657E−05 | −3.26782E−06 | 3.53892E−05 |
| A10 = | 3.29642E−07 | 1.15847E−06 | 1.57616E−06 | |

Figure 15:
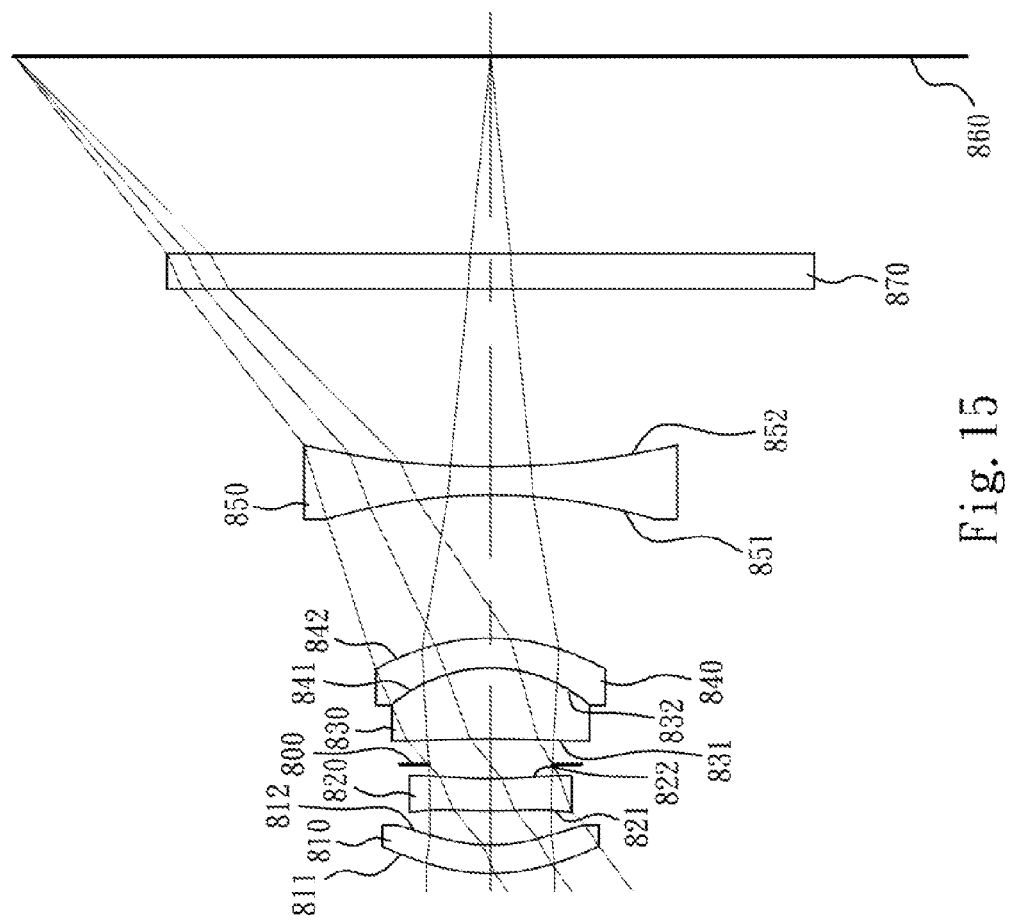
FIG. 15 is a schematic view of a lens system according to the eighth embodiment.
Figure 16:
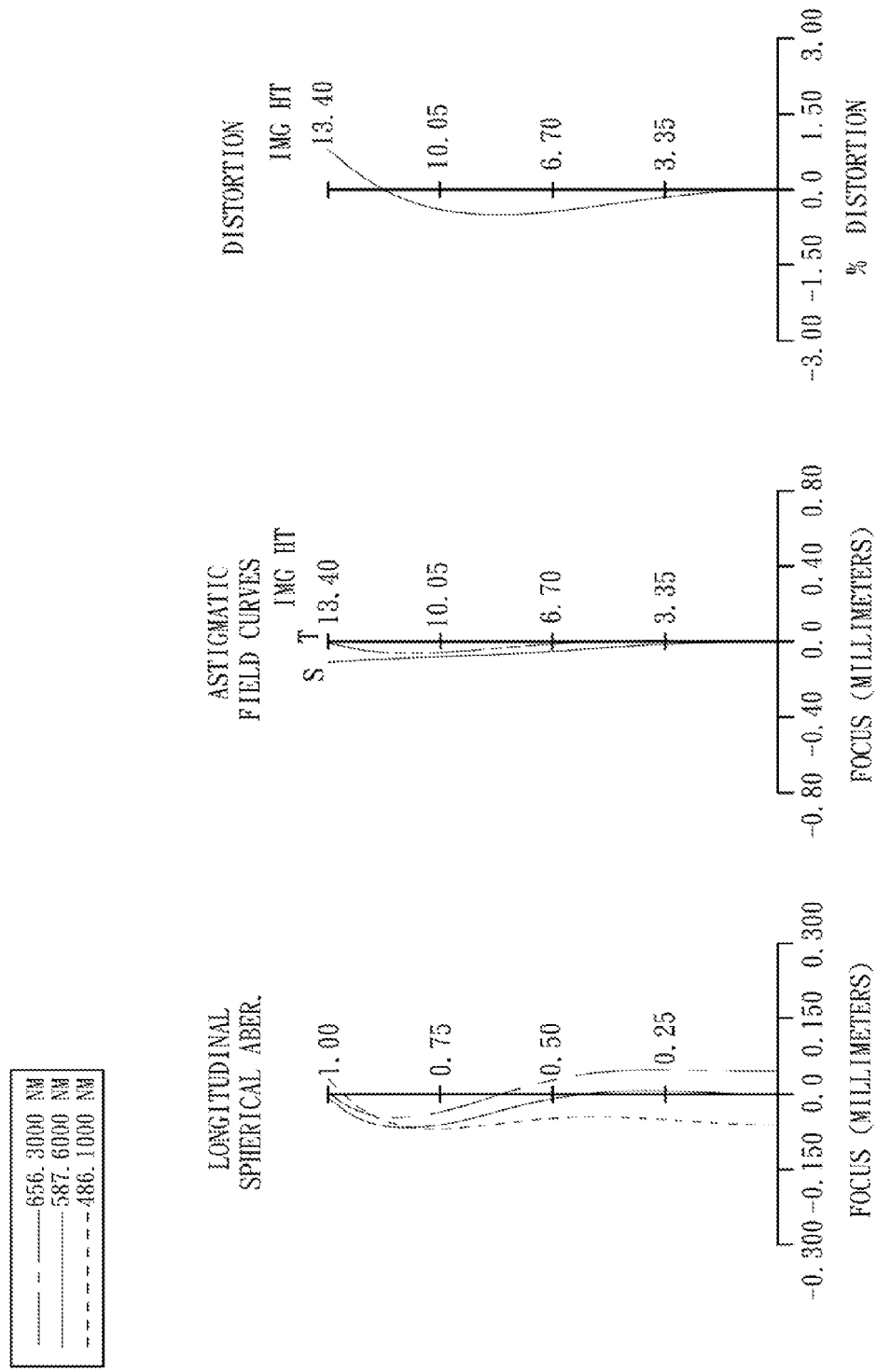
FIG. 16 shows spherical aberration curves, astigmatic field curves and distortion curve of the lens system according to the eighth embodiment.

FIG. 15 is a schematic view of a lens system according to the eighth embodiment. FIG. 16 shows spherical aberration curves, astigmatic field curves and distortion curve of the lens system according to the eighth embodiment. In FIG. 15, the lens system includes, in order from an object side to an image side, the first lens element 810, the second lens element 820, an aperture stop 800, the third lens element 830, the fourth lens element 840, the fifth lens element 650, an IR (infrared) cut filter 870 and an image plane 860.

The first lens element 810 is made of plastic material. The first lens element 810 with negative refractive power has a convex object-side surface 811 and a concave image-side surface 812. The object-side surface 811 and the image-side surface 812 of the first lens element 810 are aspheric.

The second lens element 820 is made of plastic material. The second lens element 820 with positive refractive power has a convex object-side surface 821 and a concave image-side surface 822. The object-side surface 821 and the image-side surface 822 of the second lens element 820 are aspheric.

The third lens element 830 is made of glass material. The third lens element 830 with positive refractive power has a concave object-side surface 831 and a convex image-side surface 832, wherein cement is located on the image-side surface 832 of the third lens element 830, so that the third lens element 830 can connect to the fourth lens element 840.

The fourth lens element 840 is made of glass material. The fourth lens element 840 with negative refractive power has a concave object-side surface 841 and a convex image-side surface 842, wherein the object-side surface 841 of the fourth lens element 840 is connected to the image-side surface 832 of the third lens element 830.

The fifth lens element 850 is made of plastic material. The fifth lens element 850 with negative refractive power has a concave object-side surface 851 and a concave image-side surface 852.

The IR cut filter 870 is made of glass material and is located between the fifth lens element 850 and the image plane 860 with no influence on the focal length of the lens system.

The equation of the aspheric surface profiles of the aforementioned lens elements of the eighth embodiment is the same as that of the first embodiment, and will not be stated herein again.

In the lens system according to the eighth embodiment, the definitions of f, Fno, HFOV, N3, T23, CT3, R5, R6, R7, R8, f1, f2, f3, f34, f5, Td and ImgH are the same as those stated in the first embodiment with corresponding values for the eighth embodiment, and they satisfy the following relationships:

| | | | |
|---|---|---|---|
| f(mm) | 18.01 | (R5 + R6)/(R5 − R6) | 1.22 |
| Fno | 5.00 | \|f/f2\| | 0.30 |
| HFOV(degrees) | 36.5 | f/f3 | 3.14 |
| N3 | 1.804 | f5/f1 | 0.15 |
| T23/CT3 | 0.57 | f/f34 | 2.04 |
| R7/f | −0.24 | \|f/f1\| + \|f/f2\| | 0.42 |
| R7/R8 | 0.68 | Td/ImgH | 0.85 |

The detailed optical data of the eighth embodiment is shown in Table 15, and the aspheric surface data is shown in Table 16 as follows.

TABLE 15

8th Embodiment
f = 18.01 mm, Fno = 5.00, HFOV = 36.5 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 5.533244 (ASP) | 0.817 | Plastic | 1.607 | 26.6 | −76.61 |
| 2 | | 4.927073 (ASP) | 0.966 | | | | |
| 3 | Lens 2 | 24.213075 (ASP) | 0.900 | Plastic | 1.632 | 23.4 | 53.08 |
| 4 | | 14.595068 (ASP) | 0.397 | | | | |
| 5 | Ape. Stop | plano | 0.720 | | | | |
| 6 | Lens 3 | −43.103 | 1.973 | Glass | 1.804 | 46.6 | 5.35 |
| 7 | | −4.248 | 0.010 | Cement | | | |
| 8 | Lens 4 | −4.248 | 0.850 | Glass | 1.805 | 25.4 | −20.27 |
| 9 | | −6.263 | 4.024 | | | | |
| 10 | Lens 5 | −15.939 | 0.800 | Plastic | 1.530 | 55.8 | −11.74 |
| 11 | | 23.643 | 5.000 | | | | |
| 12 | IR-filter | plano | 1.000 | Glass | 1.516 | 64.1 | — |
| 13 | | plano | 5.549 | | | | |
| 14 | Image | plano | — | | | | |

The reference wavelength (d-line) is 587.6 nm.

TABLE 16

Aspheric Coefficients

| Surface # | 1 | 2 | 3 | 4 |
|---|---|---|---|---|
| k = | −2.06888E+00 | −1.19547E+00 | −1.00000E+01 | −4.68799E+01 |
| A4 = | −7.49915E−06 | −1.50922E−03 | −4.40664E−03 | −4.87181E−04 |
| A6 = | −2.49830E−05 | −1.28194E−04 | −2.44667E−04 | −3.97029E−04 |
| A8 = | 1.02633E−06 | 2.11334E−06 | −2.29483E−05 | 4.41044E−05 |
| A10 = | 2.64329E−07 | −1.48172E−06 | 3.12880E−06 | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lens system comprising, in order from an object side to an image side:
   a first lens element with negative refractive power having a convex object-side surface and a concave image-side surface;
   a second lens element with refractive power;
   a third lens element with positive refractive power having a convex image-side surface;
   a fourth lens element with negative refractive power having a concave object-side surface, wherein the fourth lens element is connected to the third lens element; and
   a fifth lens element with negative refractive power;

wherein the lens system has a total of five lens elements with refractive power, a focal length of the first lens element is f1, a focal length of the fifth lens element is f5, a focal length of the lens system is f, a focal length of the third lens element is f3, and they satisfy the following relationships:

$0 < f5/f1 < 1.0$; and $3.39 \leq f/f3 < 4.5$.

2. The lens system of claim 1, wherein the third lens element is made of glass material.

3. The lens system of claim 2, wherein the second lens element is made of plastic material, and at least one surface of the second lens element is aspheric.

4. The lens system of claim 3, wherein the focal length of the lens system is f, a curvature radius of the object-side surface of the fourth lens element is R7, and they satisfy the following relationship:

$-0.33 < R7/f < -0.1$.

5. The lens system of claim 3, wherein the focal length of the lens system is f, the focal length of the first lens element is f1, a focal length of the second lens element is f2, and they satisfy the following relationship:

$|f/f1| + |f/f2| \leq 1.6$.

6. The lens system of claim 5, wherein a curvature radius of the object-side surface of the third lens element is R5, a curvature radius of the image-side surface of the third lens element is R6, and they satisfy the following relationship:

$0 \leq (R5+R6)/(R5-R6) < 2.0$.

7. The lens system of claim 6, wherein an axial distance between the second lens element and the third lens element is T23, a thickness of the third lens element near the optical axis is CT3, and they satisfy the following relationship:

$0 < T23/CT3 < 1.0$.

8. The lens system of claim 5, wherein a curvature radius of the object side surface of the fourth lens element is R7, a curvature radius of the mage-side surface of the fourth lens element is R8, and they satisfy the following relationship:

$-0.3 < R7/R8 < 0.85$.

9. The lens system of claim 5, further comprising:
a stop located between the second lens element and the third lens element, the focal length of the lens system is f, a composite focal length of the third lens element and the fourth lens element is f34, and they satisfy the following relationship:

$1.3 < f/f34 < 3.0$.

10. The lens system of claim 9, wherein the focal length of the lens system is f, the focal length of the second lens element is f2, and they satisfy the following relationship:

$|f/f2| < 0.6$.

11. The lens system of claim 10, wherein the focal length of the lens system is f, the composite focal length of the third lens element and the fourth lens element is f34, and they satisfy the following relationship:

$1.5 < f/f34 < 2.8$.

12. The lens system of claim 9, wherein the focal length of the lens system is f, the focal length of the first lens element is f1, the focal length of the second lens element is f2, and they satisfy the following relationship:

$|f/f1| + |f/f2| \leq 1.0$.

13. The lens system of claim 5, wherein a curvature radius of the object-side surface of the third lens element is R5, a curvature radius of the image-side surface of the third lens element is R6, and they satisfy the following relationship:

$0 \leq (R5+R6)/(R5-R6) \leq 1.0$.

14. The lens system of claim 3, wherein a refractive index of the third lens element is N3, and N3 satisfy the following relationship:

$N3 > 1.75$.

15. The lens system of claim 1, further comprising:
an image sensor located on a image plane, wherein a half of a diagonal length of an effective photosensitive area of the image sensor is ImgH, an axial distance between the object-side surface of the first lens element and the image-side surface of the fifth lens element is Td, and they satisfy the following relationship:

$Td/\mathrm{ImgH} < 1.2$.

16. A lens system comprising, in order from an object side to an image side:
a front group lens assembly comprising, in order from an object side to an image side:
a first lens element with negative refractive power having a convex object-side surface and a concave image-side surface; and
a second lens element with refractive power;
a stop; and
a rear group lens assembly comprising, in order from an object side to an image side:
a third lens element with positive refractive power having a convex image-side surface;
a fourth lens element with negative refractive power having a concave object-side surface, wherein the fourth lens element is connected to the third lens element; and
a fifth lens element with negative refractive power;
wherein the lens system has a total of five lens elements with refractive power, a focal length of the lens system is f, a focal length of the first lens element is f1, a focal length of the second lens element is f2, a focal length of the third lens element is f3, and they satisfy the following relationships:

$|f/f1| + |f/f2| \leq 1.6$; and $3.39 \leq f/f3 < 4.5$.

17. The lens system of claim 16, wherein the second lens element is made of plastic material and at least one surface of the second lens element is aspheric.

18. The lens system of claim 17, wherein a curvature radius of the object-side surface of the fourth lens element is R7, a curvature radius of an image-side surface of the fourth lens element is R8, and they satisfy the following relationship:

$-0.3 < R7/R8 < 0.85$.

19. The lens system of claim 17, wherein the focal length of the lens system is f, the focal length of the first lens element is the focal length of the second lens element is f2, and they satisfy the following relationship:

$|f/f1| + |f/f2| \leq 1.0$.

20. The lens system of claim 17, wherein the focal length of the lens system is f, the focal length of the second lens element is f2, and they satisfy the following relationship:

$|f/f2| < 0.6$.

* * * * *